(12) United States Patent
Whalen et al.

(10) Patent No.: US 12,460,664 B2
(45) Date of Patent: Nov. 4, 2025

(54) PROCESS FOR WELDING DISSIMILAR MATERIALS WITH NESTED DOVETAILS

(71) Applicant: Battelle Memorial Institute, Richland, WA (US)

(72) Inventors: Scott A. Whalen, West Richland, WA (US); Kenneth A. Ross, West Richland, WA (US); M. D. Reza-E-Rabby, Richland, WA (US); Yuri Hovanski, Mapleton, UT (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 18/494,629

(22) Filed: Oct. 25, 2023

(65) Prior Publication Data

US 2024/0052862 A1 Feb. 15, 2024

Related U.S. Application Data

(62) Division of application No. 15/694,565, filed on Sep. 1, 2017, now abandoned.
(Continued)

(51) Int. Cl.
*B23K 20/12* (2006.01)
*F16B 5/00* (2006.01)
(Continued)

(52) U.S. Cl.
CPC ............ *F16B 5/0012* (2013.01); *B23K 20/12* (2013.01); *B23K 20/1265* (2013.01); *F16B 5/08* (2013.01);
(Continued)

(58) Field of Classification Search
CPC .......... B23K 33/00; B23K 20/122–128; F16B 2200/30
See application file for complete search history.

(56) References Cited

U.S. PATENT DOCUMENTS 1,158,307 A * 10/1915 Schmidt ................. B23K 33/00
 220/908
1,614,558 A * 1/1927 Kasley ...................... B23C 3/30
 144/89
(Continued)

FOREIGN PATENT DOCUMENTS

EP 2990178 3/2016
GB 484750 A * 5/1938
(Continued)

OTHER PUBLICATIONS

"U.S. Appl. No. 16/564,872, Notice of Non-Compliant Amendment mailed Jun. 9, 2023", 3 pgs.
(Continued)

*Primary Examiner* — Keith Walker
*Assistant Examiner* — Carlos J Gamino
(74) *Attorney, Agent, or Firm* — Schwegman, Lundberg & Woessner, P.A.

(57) ABSTRACT

A method for connecting two dissimilar materials having different melting points is described wherein a the materials are heated together to obtain plasticization of the lower melting point material within a prefigured geometry within a first material in such a way so as to form intermetallic features within a solid state joint.

9 Claims, 29 Drawing Sheets

Related U.S. Application Data

(60) Provisional application No. 62/533,851, filed on Jul. 18, 2017, provisional application No. 62/393,409, filed on Sep. 12, 2016.

(51) Int. Cl.
  *F16B 5/08* (2006.01)
  *F16B 17/00* (2006.01)
  *B23K 103/20* (2006.01)

(52) U.S. Cl.
  CPC ........ *F16B 17/008* (2013.01); *B23K 2103/20* (2018.08)

(56) References Cited

U.S. PATENT DOCUMENTS

| | | | |
|---|---|---|---|
| 1,619,133 A * | 3/1927 | Kasley | F01D 5/3007 29/889.21 |
| 3,432,369 A | 3/1969 | Naastepad | |
| 3,640,657 A | 2/1972 | Rowe et al. | |
| 3,661,726 A | 5/1972 | Denes | |
| 3,684,593 A | 8/1972 | Benz et al. | |
| 3,884,062 A | 5/1975 | Green | |
| 3,892,603 A | 7/1975 | Reid | |
| 3,933,536 A | 1/1976 | Doser et al. | |
| 3,977,918 A | 8/1976 | Paladino et al. | |
| 3,989,548 A | 11/1976 | Morris | |
| 4,010,965 A | 3/1977 | Izuma et al. | |
| 4,287,749 A | 9/1981 | Bachrach et al. | |
| 4,300,376 A | 11/1981 | Wilmotte | |
| 4,300,378 A | 11/1981 | Thiruvarudchelvan | |
| 4,333,670 A | 6/1982 | Holko | |
| 4,400,137 A * | 8/1983 | Miller | F01D 5/326 416/193 A |
| 4,585,473 A | 4/1986 | Narasimhan et al. | |
| 4,778,542 A | 10/1988 | Clemens | |
| 4,801,340 A | 1/1989 | Inoue et al. | |
| 4,808,224 A | 2/1989 | Anderson et al. | |
| 4,892,596 A | 1/1990 | Chatterjee | |
| 4,985,085 A | 1/1991 | Chatterjee | |
| 5,026,438 A | 6/1991 | Young et al. | |
| 5,089,060 A | 2/1992 | Bradley et al. | |
| 5,242,508 A | 9/1993 | McCallum et al. | |
| 5,262,123 A | 11/1993 | Thomas et al. | |
| 5,283,130 A | 2/1994 | Bradley et al. | |
| 5,437,545 A | 8/1995 | Hirai | |
| 5,461,898 A | 10/1995 | Lessen | |
| 5,470,401 A | 11/1995 | McCallum et al. | |
| 5,492,264 A | 2/1996 | Wadleigh | |
| 5,737,959 A | 4/1998 | Korbel et al. | |
| 5,739,498 A | 4/1998 | Sunamoto et al. | |
| 6,022,424 A | 2/2000 | Sellers et al. | |
| 6,036,467 A | 3/2000 | Jameson | |
| 6,139,001 A * | 10/2000 | Buck | B25B 1/2405 267/43 |
| 6,638,462 B2 | 10/2003 | Davidson et al. | |
| 6,676,008 B1 | 1/2004 | Trapp et al. | |
| 6,843,405 B2 | 1/2005 | Okamoto et al. | |
| 6,940,379 B2 | 9/2005 | Creighton | |
| 7,096,705 B2 | 8/2006 | Segal | |
| 7,314,670 B2 | 1/2008 | Bartsch et al. | |
| 7,322,508 B2 | 1/2008 | Chang et al. | |
| 7,954,692 B2 | 6/2011 | Fukuda | |
| 8,016,179 B2 | 9/2011 | Burford | |
| 8,052,033 B2 | 11/2011 | Nakagawa et al. | |
| 8,240,540 B2 | 8/2012 | Tanaka et al. | |
| 8,313,692 B2 | 11/2012 | Somekawa et al. | |
| 8,695,868 B2 | 4/2014 | Messer et al. | |
| 10,189,063 B2 | 1/2019 | Lavender et al. | |
| 10,369,748 B2 | 8/2019 | Whalen et al. | |
| 10,695,811 B2 | 6/2020 | Joshi et al. | |
| 11,052,480 B2 | 7/2021 | Karvinen et al. | |
| 2002/0029601 A1 | 3/2002 | Kwok | |
| 2002/0190100 A1 | 12/2002 | Duncan | |
| 2003/0024965 A1 | 2/2003 | Okamura et al. | |
| 2003/0206803 A1 * | 11/2003 | Herman | F01D 5/147 416/93 R |
| 2004/0057782 A1 | 3/2004 | Okamoto et al. | |
| 2004/0238501 A1 | 12/2004 | Kawazoe et al. | |
| 2004/0265503 A1 | 12/2004 | Clayton et al. | |
| 2005/0121497 A1 | 6/2005 | Fuller et al. | |
| 2006/0005898 A1 | 1/2006 | Liu et al. | |
| 2008/0029581 A1 | 2/2008 | Kumagai et al. | |
| 2008/0048005 A1 | 2/2008 | Forrest et al. | |
| 2008/0202653 A1 | 8/2008 | Ignberg | |
| 2008/0251571 A1 | 10/2008 | Burford | |
| 2009/0072007 A1 | 3/2009 | Nagano | |
| 2009/0291322 A1 | 11/2009 | Watanabe et al. | |
| 2010/0059151 A1 | 3/2010 | Iwamura et al. | |
| 2010/0089976 A1 | 4/2010 | Szymanski et al. | |
| 2010/0132430 A1 | 6/2010 | Tsai et al. | |
| 2011/0104515 A1 | 5/2011 | Kou et al. | |
| 2011/0132970 A1 | 6/2011 | Nakagawa et al. | |
| 2011/0309131 A1 | 12/2011 | Hovanski et al. | |
| 2012/0006086 A1 | 1/2012 | Manchiraju et al. | |
| 2012/0052322 A1 | 3/2012 | Hatakeyama et al. | |
| 2012/0168045 A1 | 7/2012 | Ihara et al. | |
| 2012/0258332 A1 | 10/2012 | Hatakeyama et al. | |
| 2013/0075452 A1 | 3/2013 | Burford | |
| 2014/0002220 A1 | 1/2014 | Johnson et al. | |
| 2014/0076957 A1 | 3/2014 | Sayama et al. | |
| 2014/0102161 A1 | 4/2014 | Stewart | |
| 2014/0248508 A1 | 9/2014 | Ohhama et al. | |
| 2014/0283574 A1 | 9/2014 | Lavender et al. | |
| 2015/0075242 A1 | 3/2015 | Eller et al. | |
| 2015/0115019 A1 | 4/2015 | Pascal et al. | |
| 2015/0360317 A1 | 12/2015 | Kalvala et al. | |
| 2016/0008918 A1 | 1/2016 | Burford | |
| 2016/0167353 A1 | 6/2016 | Fan et al. | |
| 2016/0175981 A1 | 6/2016 | Kandasamy | |
| 2016/0175982 A1 | 6/2016 | Kandasamy et al. | |
| 2016/0184922 A1 | 6/2016 | Kikyo | |
| 2016/0228932 A1 | 8/2016 | Hayashi et al. | |
| 2016/0354860 A1 | 12/2016 | Boettcher et al. | |
| 2017/0008121 A1 | 1/2017 | Li | |
| 2017/0136686 A1 | 5/2017 | Ueno et al. | |
| 2017/0163134 A1 | 6/2017 | Posselt et al. | |
| 2017/0163135 A1 | 6/2017 | Emberton et al. | |
| 2017/0182587 A1 | 6/2017 | Tokoro et al. | |
| 2017/0197274 A1 | 7/2017 | Steel et al. | |
| 2017/0216961 A1 | 8/2017 | Utter et al. | |
| 2017/0225265 A1 | 8/2017 | Ito et al. | |
| 2017/0304933 A1 | 10/2017 | Miles et al. | |
| 2018/0043467 A1 | 2/2018 | Huysmans | |
| 2018/0050419 A1 | 2/2018 | Das et al. | |
| 2018/0311713 A1 | 11/2018 | Joshi et al. | |
| 2018/0354231 A1 | 12/2018 | Iwase | |
| 2018/0361498 A1 | 12/2018 | Zhang et al. | |
| 2018/0369889 A1 | 12/2018 | Zhang et al. | |
| 2019/0059593 A1 * | 2/2019 | Davis | B27F 1/12 |
| 2019/0275608 A1 | 9/2019 | Das et al. | |
| 2021/0086291 A1 | 3/2021 | Okada et al. | |
| 2021/0205918 A1 | 7/2021 | Fujii et al. | |

FOREIGN PATENT DOCUMENTS

| | | |
|---|---|---|
| JP | 2003275876 | 9/2003 |
| JP | 2007222925 | 9/2007 |

OTHER PUBLICATIONS

"U.S. Appl. No. 15/694,565, Notice of Non-Compliant Amendment mailed Jun. 9, 2023", 3 pgs.
"ThomasNet.com", Online: www. thomasnet.com articles custom-manufacturing-fabricating friction-stir-welding, (Feb. 10, 2011), 2 pgs.
"U.S. Appl. No. 14/222,468, Non Final Offce Action mailed Nov. 6, 2015", (Nov. 6, 2015), 11 pgs.
"U.S. Appl. No. 14/222,468, Final Office Action mailed Apr. 1, 2016", (Apr. 1, 2016), 10 pgs.
"U.S. Appl. No. 14/222,468, Advisory Action mailed May 20, 2016", (May 20, 2016), 2 pgs.

(56) References Cited

OTHER PUBLICATIONS

"U.S. Appl. No. 14/222,468, Final Office Action mailed Jan. 26, 2017", (Jan. 26, 2017), 9 pgs.

"U.S. Appl. No. 14/268,220, Office Action mailed Dec. 1, 2015", (Dec. 1, 2015), 8 pgs.

"International Application Serial No. PCT US2019 040730, International Preliminary Report on Patentability mailed Jan. 5, 2021", (Jan. 5, 2021), 8 pages.

"International Application Serial No. PCT US2019 040730, International Search Report mailed Oct. 21, 2019", (Oct. 21, 2019), 4 pages.

"International Application Serial No. PCT US2019 040730, Written Opinion mailed Oct. 21, 2019", (Oct. 21, 2019), 7 pages.

"International Application Serial No. PCT US2020 05168 International Search Report mailed Feb. 8, 2021", (Feb. 8, 2021), 5 pages.

"International Application Serial No. PCT US2020 05168 Written Opinion mailed Feb. 8, 2021", (Feb. 8, 2021), 6 pages.

"International Application Serial No. PCT US2021 050022, Written Opinion mailed Feb. 3, 2022", 11 pgs.

"International Application Serial No. PCT US2021 050022, International Search Report mailed Feb. 3, 2022", 5 pgs.

Abu-Farha, Fadi, "A Preliminary Study on the Feasibility of Friction Stir Back Extrusion", Scripta Materialia vol. 66 Issue 9; 615-618, (May 2012), 4 pgs.

Amancio-Filho, Sergio T., "Joining of Polymers and Polymer-Metal Hybrid Structures: Recent Developments and Trends", Polymer Engineering and Science vol. 49 Issue: 8, (Aug. 2009), 16 pgs.

Bozzi, S., "Intermetallic Compounds in Al 6016 IF-Steel Friction Stir Spot Welds", Material Science and Engineering: A vol. 527, Issue: 16-17, (Jun. 25, 2010), 5 pgs.

Cole, G. S., "Lightweight materials for Automotive Applications", Materials Characterization vol. 35, Issue: 1, (Jul. 1995), 7 pgs.

Evans, William T., "Friction Stir Extrusion: A new process for joining dissimilar materials", Manufacturing Letters, vol. 5; 25-28, (Aug. 2015), 4 pgs.

Gann, John A., "Magnesium Industry's Lightest Structural Metal", SAE Transactions, vol. 25 26, (1930-1931), 17 pgs.

Hammond, Vincent H., "Equal-Channel Angular Extrusion of a Low-Density High-Entropy Alloy Produced by High-Energy Cryogenic Mechanical Alloying", The Journal of The Minerals, Metals and Materials Society, (Sep. 23, 2014), 9 pgs.

Kaiser, F., "Anisotropic Properties of Magnesium Sheet AZ31", Materials Science Forum, vol. 419-4, (2003), 7 pgs.

Kuo, M. C., "Fabrication of High Performance Magnesium Carbon-Fiber PEEK Laminated Composites", Materials Transactions, vol. 44, Issue: 8, (2003), 7 pgs.

Leitao, C., "Aluminum-steel lap joining by multi pass friction stir welding", Materials and Design, vol. 106, (Sep. 15, 2016), 8 pgs.

Liu, Bin, "Microstructure and mechanical properties of equimolar FeCoCrNi high entropy alloy prepared via powder extrusion", Intermetallics, vol. 75,, (Aug. 2016), 6 pgs.

Liu, Liming, "A Review of Dissimilar Welding Techniques for Magnesium Alloys to Aluminum Alloys", Materials, (2014), 23 pgs.

Luo, Alan A., "Magnesium: Current and Potential Automotive Applications", The Journal of The Minerals, Metals and Materials Society, (Feb. 2002), 7 pgs.

Martinsen, K., "Joining of Dissimilar Materials", CIRP Annals, vol. 64, Issue 2, (2015), 21 pgs.

Nakamura, Takashi, "Tool Temperature and Process Modeling of Friction Stir Welding", Modern Mechanical Engineering, vol. 8, Issue 1, (Feb. 2018), 17 pgs.

Pickens, J. R., "Aluminum Powder Metallurgy Technology for High-Strength Applications", Journal of Materials Science, (Jun. 1981), 21 pgs.

Rodewald, W., "Top Nd—Fe—B Magnets with Greater Than 56 MGOe Energy Density and 9.8 kOe Coercivity", IEEE Transactions on Magnets, vol. 38, Issue 5, (Sep. 2002), 3 pgs.

Saha, Pradip K., "Aluminum Extrusion Technology, Chapter 1, Fundamentals of Extrusion", ASM International, (2000), 29 pgs.

Trang, T. T.T., "Designing a Magnesium Alloy with High Strength and High Formability", Nature Communications, (Jun. 28, 2018), 6 pgs.

Whalen, Scott, "High Ductility Aluminum Alloy Made from Powder by Friction Extrusion", Materialia, vol. 6, (Jun. 2019), 6 pgs.

Zhang, Z., "Numerical Studies on Effect of Axial Pressure in Friction Stir Welding", Science and Technology of Welding and Joining, vol. 12, Issue 3, (2007), 24 pgs.

"U.S. Appl. No. 18/494,48, Non Final Office Action mailed Jan. 10, 2025", 11 pgs.

"U.S. Appl. No. 18/494,48, Response filed Apr. 10, 2025 to Non Final Office Action mailed Jan. 10, 2025", 10 pgs.

"U.S. Appl. No. 18/494,48, Response filed Sep. 23, 2024 to Restriction Requirement mailed May 21, 2024", 7 pgs.

"U.S. Appl. No. 18/494,48, Restriction Requirement mailed May 21, 2024", 5 pgs.

* cited by examiner

PROCESS FOR WELDING DISSIMILAR MATERIALS WITH NESTED DOVETAILS

PRIORITY

This invention is a divisional of U.S. patent application Ser. No. 15/694,565 filed Sep. 1, 2017, which claims priority from and incorporates by reference provisional patent application No. 62/393,409 entitled System And Process For Joining Dissimilar Materials And Solid-State Interlocking Joint With Intermetallic Interface Formed Thereby filed Sep. 12, 2016. It also incorporates provisional patent application No. 62/533,851 entitled The Joining Of Dissimilar Metals Through Formation Of Dovetail Extrusions With Metallurgically Bonded Interfaces filed: Jul. 18, 2017.

STATEMENT AS TO RIGHTS TO INVENTIONS MADE UNDER FEDERALLY-SPONSORED RESEARCH AND DEVELOPMENT

This invention was made with Government support under Contract DE-AC0576RL01830 awarded by the U.S. Department of Energy. The Government has certain rights in the invention.

BACKGROUND OF THE INVENTION

Field of the Invention

The invention generally relates to methods for joining dissimilar materials and more particularly to connections between dissimilar metals having different melting points.

A world of rising energy necessitates approaches for reducing the amount of energy needed to perform standard tasks. Among approaches under development are lighter more fuel efficient vehicles. Reducing the weight of vehicles can be accomplished in a variety of ways including replacing heavier steel regions with lighter weight materials such aluminum, plastic, carbon fiber or other dissimilar materials. However, difficulty has arisen in attempting to find ways to robustly join dissimilar materials in a way that provides the needed strength and resiliency that exists in structures that are made from the same material. Preferably, and in some instances by requirement, these seams and interconnects must be welded together. Welding is fairly straight forward when the two materials have similar melting points but becomes more and more difficult when the materials have vastly different melting points or other characteristics.

Joining materials such as steel to aluminum, titanium, magnesium, or copper, or any combination thereof, has proved difficult for a variety of reasons. The prior art generally teaches that when these materials are joined that the temperatures must be maintained generally low so as to prevent the formation of brittle intermetallic compounds, which are generally believed to cause the welds to be brittle and fail. Most prior art methodologies for joining dissimilar materials have focused on getting rid of these brittle intermetallic portions especially when the intermetallic is the only means of joining the two dissimilar metals together.

One of the ways that this is done is by isolating the other metal from the molten aluminum during the arc welding process. Techniques such as coatings, or inserting bimetallic inserts that contain portions of each of the two types of metals and which were formed by another process and welding the materials to the inserts are methodologies that have been taught and practiced. However, the needs for these additional steps increase the complexity and cost and are generally unsuitable in a high throughput manufacturing environment because of these issues and concerns.

Hence what is needed is a process for forming high strength joints between dissimilar materials in ways that are simpler cheaper and more effective than the current methodologies. The present invention is a significant step forward in addressing these needs.

Additional advantages and novel features of the present invention will be set forth as follows and will be readily apparent from the descriptions and demonstrations set forth herein. Accordingly, the following descriptions of the present invention should be seen as illustrative of the invention and not as limiting in any way.

SUMMARY

In one embodiment of the disclosure a method for connecting two dissimilar materials having different melting points is described wherein a first material having a higher melting point than a second material is plasticized to fill a preformed groove, shape or depression in the surface of a second material. The first and second materials are heated together (preferably rubbed and heated by friction) to obtain plasticization of the lower melting point material so as to cause the plasticization of the material and the movement of the material into the surface feature (groove) in such a way so as to form intermetallic features of the material within the solid state joint. Preferably and in some embodiments the temperature within the joint is controlled so as to prevent overheating of the weld. Examples of how this temperature control is achieved is described in more detail in the detailed description.

In some embodiments the method maybe performed using a friction stir welding device that extends to a plunge depth greater than the thickness of the second material. Various other features of the friction stir method may be appropriately modified so as to obtain the desired result. This may include varying the rate of traverse, process temperature, force pressures, rotation speeds, tool operational orientation, tip and shoulder temperatures, pretreatments including surface coatings, pre-fillings and other pretreatments and other parameters. In addition, various configurations and operations of the various apertures, features, grooves, dovetail shaped depressions or other features of the devices may also be employed.

In one exemplary arrangement the groove contains nested dovetail grooves and the friction stir welding tool is plunged into to the lower of two nested dovetail grooves such that a portion of the material defining the lower groove contacts the friction stir welding tool and results in the forming at least one feature of higher melting temperature material that extend upward into the lower melting temperature material. In addition to this single exemplary embodiment a variety of other embodiments are also described and set forward.

The result of the implementation of this methodology for joining materials is the formation of a joint that has a geometric shape defined by a preformed groove in a first metal material having a first melting point that has been filled with a second material that has a second lower melting point that has been plasticized and heated to both fill the preformed groove and form intermetallic containing features. This method and these joints can be found in a variety of heterogeneous combinations including combinations of aluminum to steel and other metallic and non-metallic combinations.

Various advantages and novel features of the present invention are described herein and will become further readily apparent to those skilled in this art from the following detailed description. In the preceding and following descriptions we have shown and described only the preferred embodiment of the invention, by way of illustration of the best mode contemplated for carrying out the invention. As will be realized, the invention is capable of modification in various respects without departing from the invention. Accordingly, the drawings and description of the preferred embodiment set forth hereafter are to be regarded as illustrative in nature, and not as restrictive.

DETAILED DESCRIPTION OF THE INVENTION

The following description includes examples of various embodiments of the present invention. It will be clear from this description of the invention that the invention is not limited to these illustrated embodiments but that the invention also includes a variety of modifications and embodiments thereto. Therefore the present description should be seen as illustrative and not limiting. There is no intention in the specification to limit the invention to the specific form disclosed, but, on the contrary, the invention is to cover all modifications, alternative constructions, and equivalents falling within the spirit and scope of the invention as defined in the claims.

The present invention centers around the joining of dissimilar materials by utilizing a combination of embedded portions of a first material within a preformed geometric shape or groove located in another material under process conditions and tooling geometries able to form an intermetallic interconnection or layer at the dissimilar interface within the preformed shape or groove. Joining metals with different melting temperatures can be accomplished by extruding a lower melting temperature material into groves in a higher melting temperature material while simultaneously forming a metallurgical bond within the groove at the interface between the dissimilar metals. Joints with this configuration exhibit superior strength and ductility compared to other known techniques for Friction Stir Welding (FSW) of aluminum to steel.

In one embodiment, a method for creating such a connection using a friction stir welding tool to heat the materials, cause plasticization and the formation of intermetallic features and layers are described. Contrary to prior art which teaches that intermetallics and layers should not be created within preformed grooves, the method described herein teaches that creating intermetallics and layers within preformed grooves significantly improve strength and ductility.

Figure 1:
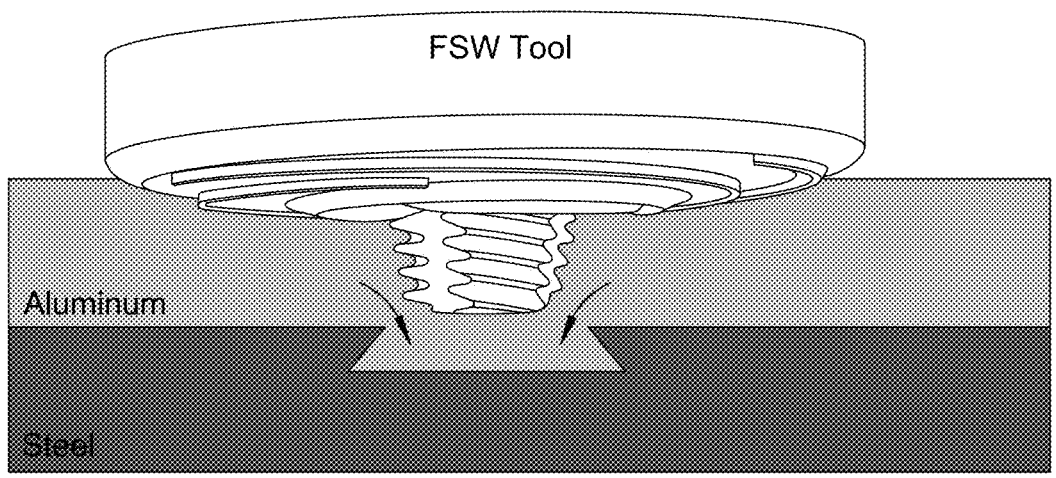
FIG. 1 shows a prior art configuration of a friction stir welding arrangement for use in connecting different materials

FIGS. 3-25 demonstrate various examples and embodiments of the invention. Referring however, first to FIG. 1, a prior art configuration of a friction stir welding arrangement for use in connecting different materials is shown. In such an arrangement a friction stir welding tool (FSW) and a material are brought into contact and the material (typically the lower melting point material) is plasticized by the rotating tool. The tool and the plasticized zone that the rotating tool forms (stir zone) are traversed over a joint or along or raster path. When the lower melting temperature material is heated by the friction stir welding device the lower temperature materials is plasticized and flows down into the preformed grooves in the higher temperature material.

Figure 2:
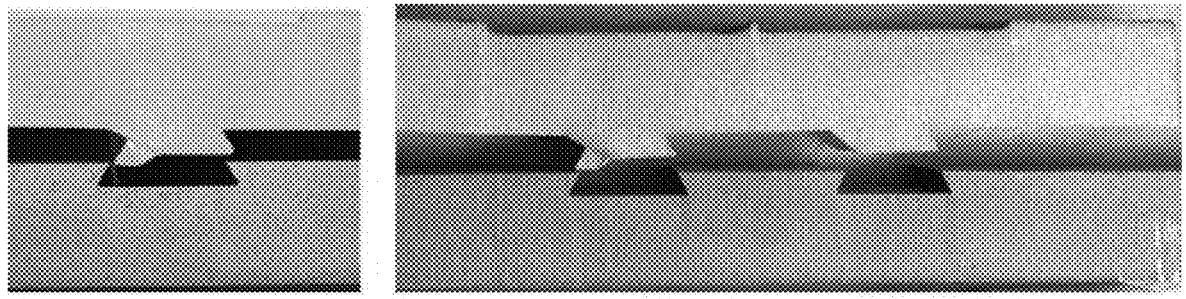
FIG. 2 shows failed joints created by the arrangement shown in FIG. 1 with no metalurgically bonded interlayer.

Typically the configuration is arranged such that the tool does not enter into the dovetail and is far from contacting the higher melting temperature material to prevent mixing conditions and elevated temperatures which would form intermetallic layers at the interface between the higher and lower melting point materials. Generally speaking, it is believed that lower temperature welds are stronger because of the more finely grained microstructures that performing welds under these conditions can create. Therefore existing teachings in the art of friction stir welding try to run the weld as cold as possible and to avoid higher temperature operating conditions and the formation of intermetallic interfaces. As a result the connections that are formed by plasticizing and pushing the softened material down into without forming an intermetallic connection or layer results in a purely mechanical interconnection that may provide mechanical strength in one direction but does not include metallurgically bonded interlayer in other direction that the present invention provides. An example of the failure after tensile testing is shown in the photograph in FIG. 2 for a single and double dovetail joints with no metallurgically bonded interlayer. The lower melting point material, aluminum in this case, easily tears out from the groove within the higher melting point material (steel in this case).

Figure 3:
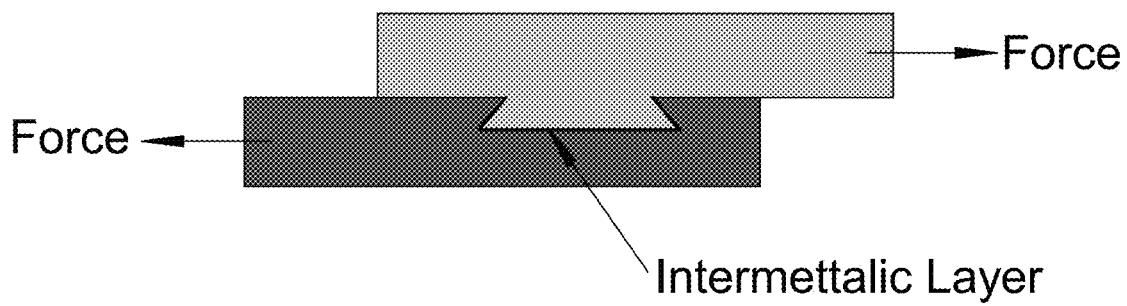
FIG. 3 shows an example of two materials of differing melting points joined in an overheating process where intermetallics are intentionally formed at the dissimilar interface.

In embodiments of the present invention, such as the example shown in FIG. 3, two materials of differing melting points are joined in a process wherein what is typically termed as overheating of the joint occurs and an intermetallic layer is formed within in the dovetail interconnect and strengthens rather than weakens the connection between the higher and lower temperature materials.

Figure 4:
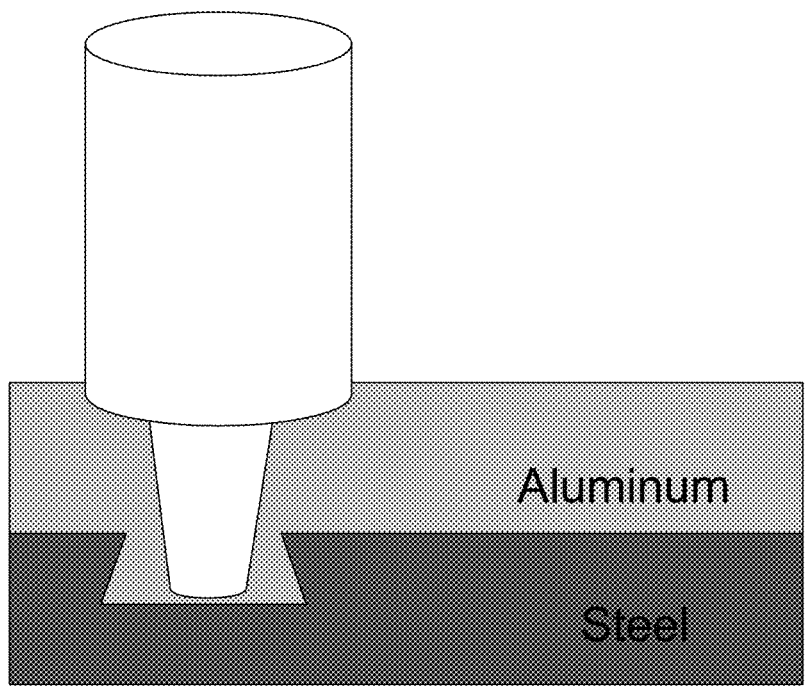
FIG. 4 shows an example of one embodiment of the present disclosure.

In one example of this process called Friction Stir Dovetailing (FSD) a custom designed friction stir welding pin extends into the preformed feature (groove, slot, dovetail, or other depression of a predesignated geometry) and generates heat sufficient to both plasticize the lower melting point material such that it flows into the preformed feature while also heating the higher melting point material through rubbing to a point whereby the filled feature contains intermetallic features (or layer) at the joint interface. An example of such an arrangement for performing this method is shown in FIG. 4. This methodology has shown to be effective when the traverse rate is between 10 mm to 200 mm per minute, the process temperatures range from about 300° C. to about 600° C., the vertical force is between about 1,000 pounds to about 25,000 pounds and the tool rpm between about 50 rpm to about 1000 rpm. All possible parameter combinations for all possible materials have not been examined and parameters outside the general ranges given may also produce the desired intermetallic. Thus the ranges given should not be viewed as restrictive but are exemplary. In other embodiments combinations of other heating methodologies may also be utilized whereby insertion of the tip of the FSW into the higher temperature material is not always necessary to achieve the formation of intermetallic features.

Figure 5:
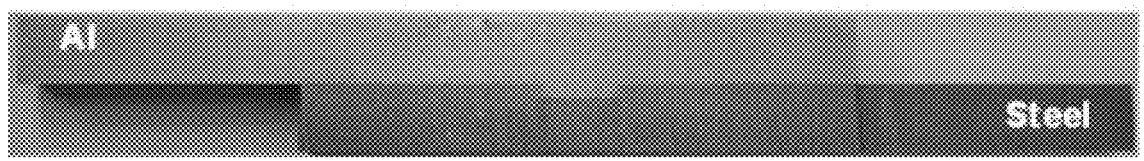
FIG. 5 shows an intermetallic reinforced connection prior to tensile testing.
Figure 6:
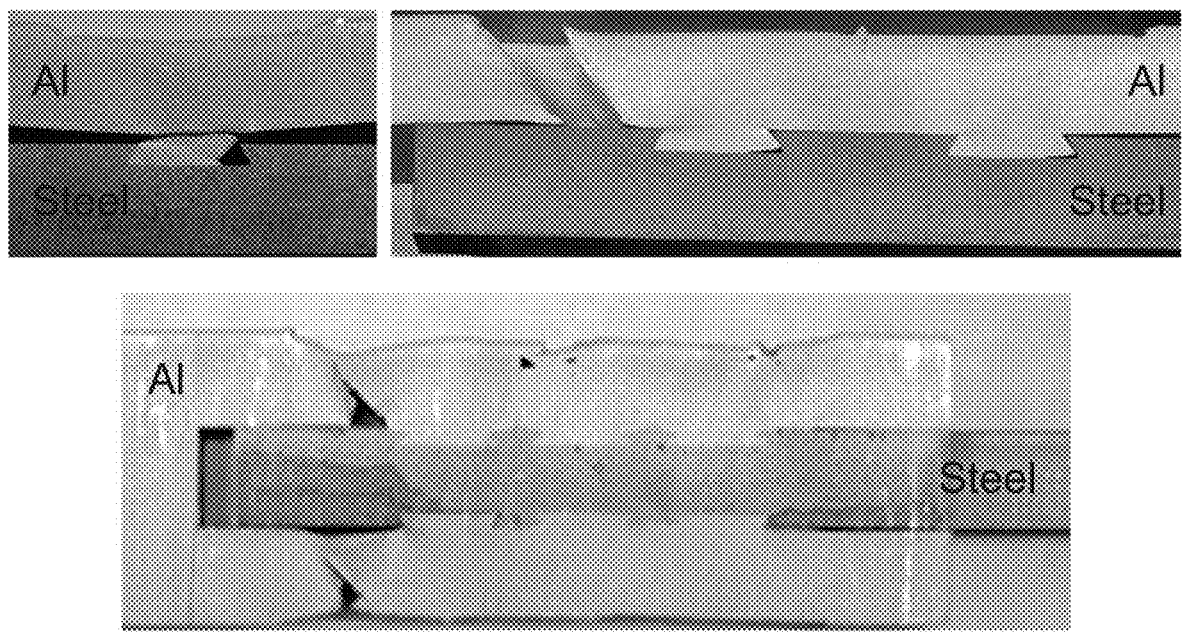
FIG. 6 shows specimens after tensile testing when an intermetallic is intentionally formed at the dissimilar interface performed on various disclosed examples.

Contrary to the teachings in the art, the formation of this intermetallic connection between, for example, aluminum and steel within these locking sections significantly improves joint strength. This process is particularly applicable to thick section joints where no other practical solution currently exists. An intermetallic reinforced connection is shown in FIG. 5.

The effectiveness of FSD with an intermetallic layer for an AA6061 and Rolled Homogeneous Armor joint is demonstrated through tensile test data which shows specimens failing in the processed aluminum rather than at the joint interface. (see FIG. 6).

Figure 7:
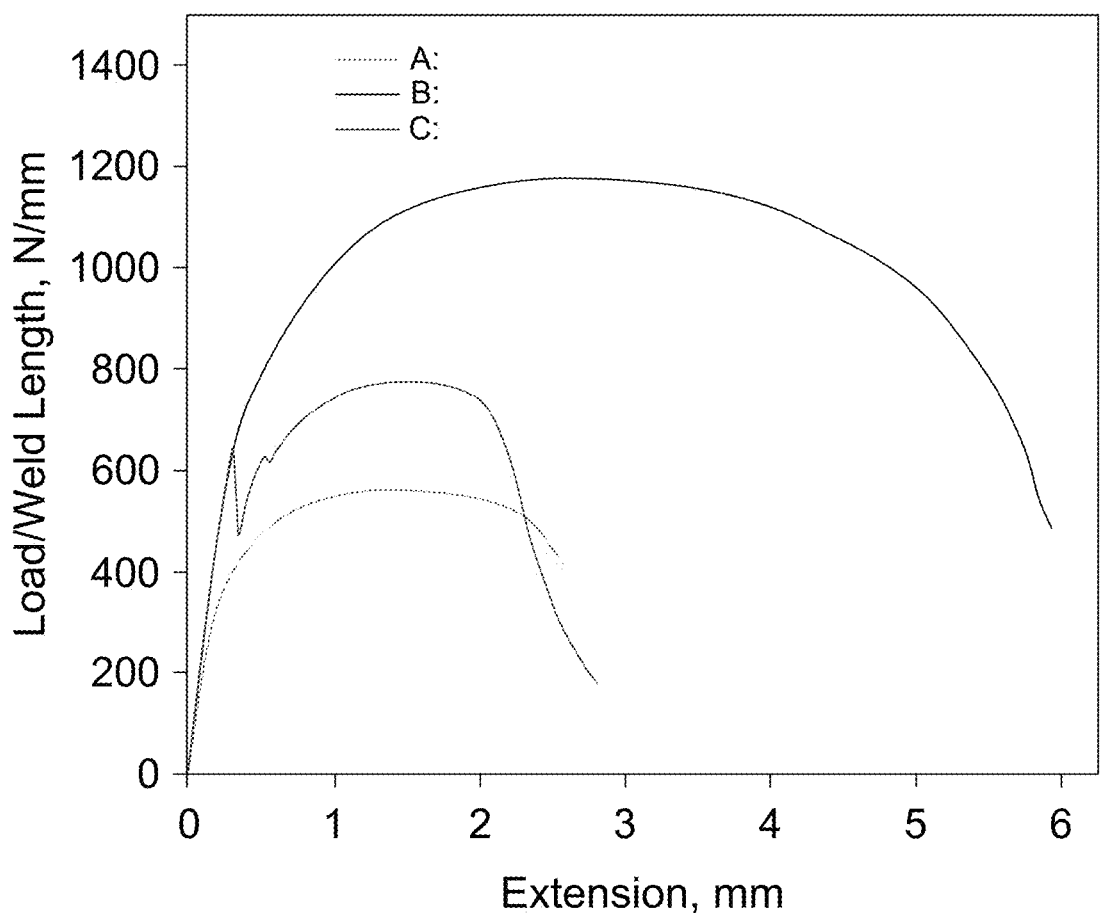
FIG. 7 shows plots of the data reflected in Table 1.

The data reflected in Table 1 is plotted in FIG. 7 and illustrates the effect of the formation of an intermetallic interface. In samples A, no intermetallic interface was formed. In examples B and C these intermetallic interfaces were formed to different degrees. As the data shows the inclusion of the interface in sample B increased the max. tensile load by 107% and extension at max. load increased by 92%. In sample C the max. tensile load was increased by 42% and extension at max. load increased by 5%. The improvements attained with B (with intermetallic) compared to A (no intermetallic) are even larger when considering the load and extension at 75% of maximum load where failure is conventionally defined. Contrary to the teachings of the prior art, a process that includes infilling with intermetallic formation has shown to be an effective process of joining and welding dissimilar materials and does not weaken the weld as the prior art suggests. In this described arrangement the entire dissimilar interface within the dovetail can react to stresses in more than a mechanical interlock in one direction. With intermetallic present, failure has been driven into the bulk material away from the joint; a highly desirable failure mode.

Figure 8:
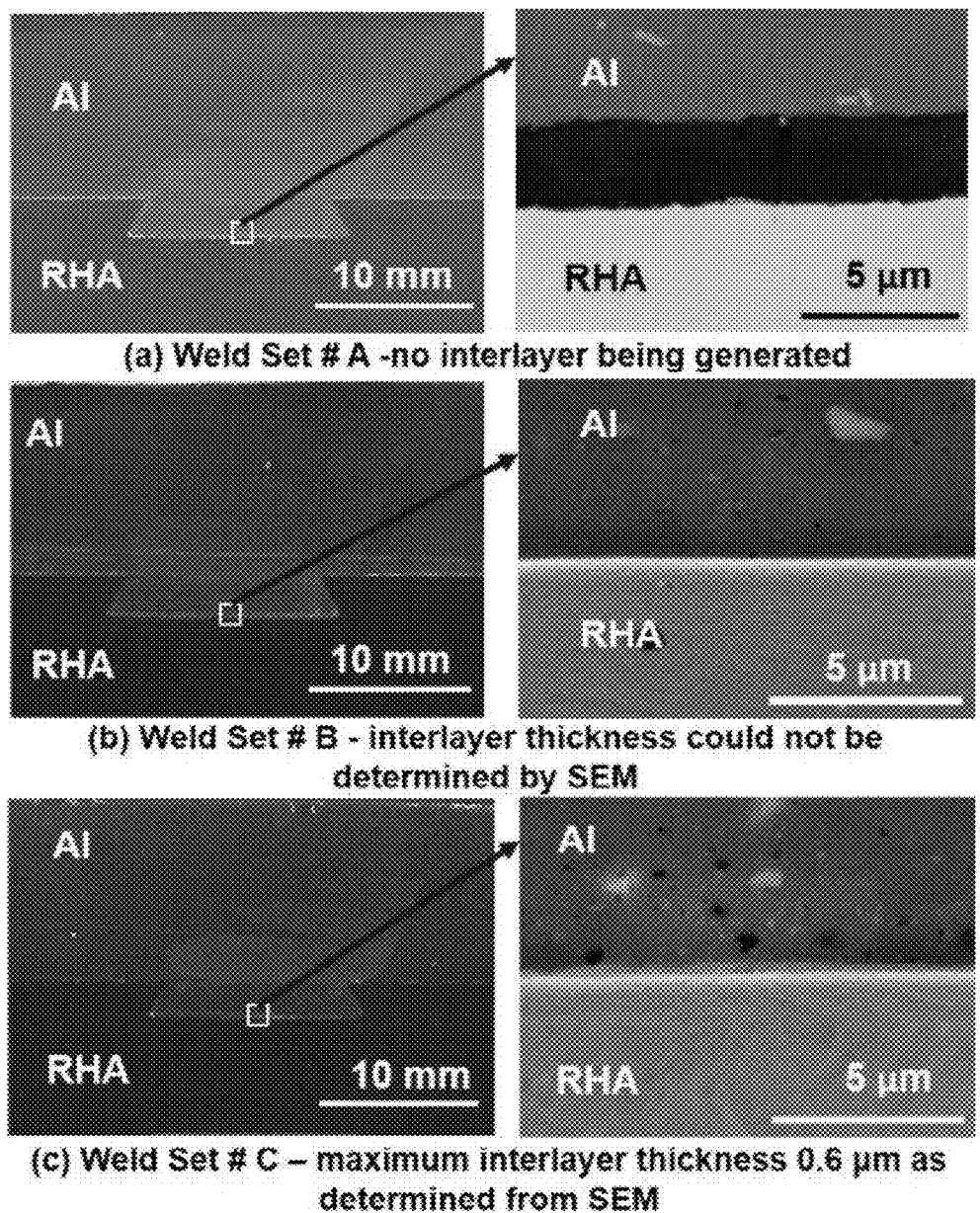
FIG. 8 shows SEM photographs of the intermetallic features in the filled dovetail sections corresponding to FIG. 7 and Table 1.

This arrangement prevents sheering of the angled lower temperature piece such as aluminum and dovetail pullout resulting in greatly improved strength of the joint. This results in lap sheer samples that fail in the lower temperature material, not at the joint. The results show that using FSP or FSW to extrude a plasticized material into an existing feature/s in a material of higher plasticization temperature with the intent to create a mechanical interlock where an intermetallic is created at the dissimilar material interface within the dovetail during the process is superior to joints where the intermetallic interconnect are not formed. SEM photographs of the intermetallic features in the filled dovetail section are shown in FIG. 8. Table 2 below shows the process conditions which generated the aluminum-steel intermetallic described in FIG. 8 leading to the data depicted in FIG. 7.

TABLE 2

| Weld Set | Tool Plunge Depth (mm) | Shoulder Scroll Numbers | Shoulder Temperature Degrees (C.) | Avg. Rotational Speed RPM | Avg. Forge Force kN | Avg. Weld Power kW | Avg. WC TIP Temperature Degrees C. |
|---|---|---|---|---|---|---|---|
| A | 15.22 | 3 | 470 | 170 | 35 | 4.95 | 475 |
| B | 15.45 | 3 | 470 | 150 | 57 | 4.85 | 490 |
| C | 15.45 | 2 | 470 | 400 | 19 | 5.25 | 570 |

TABLE 1

| Weld Set | Maximum Load N/mm | Extension at Maximum Load mm | 75% of Maximum Load N/mm | Extension at 75% Maximum Load mm |
|---|---|---|---|---|
| A | 560 ± 6 | 1.42 ± 0.04 | 420 ± 6 | 2.57 ± 0.05 |
| B | 1175 ± 36 | 2.73 ± 0.26 | 881 ± 27 | 5.36 ± 0.32 |
| C | 797 ± 25 | 1.49 ± 0.04 | 582 ± 18 | 2.24 ± 0.03 |

Figure 9:
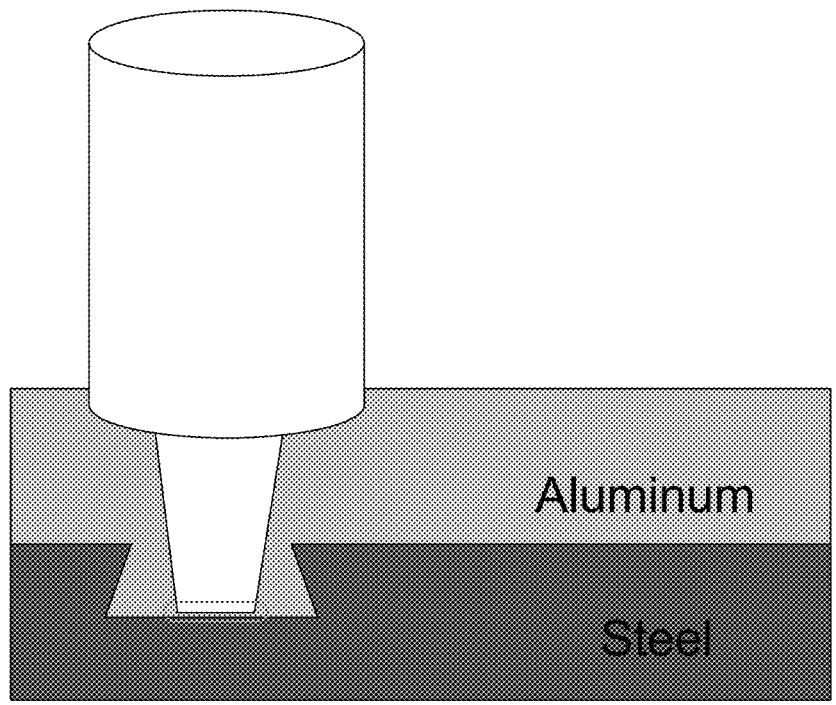
FIGS. 9-11 show various embodiments and configurations of friction stir welding tools with mechanical contact shown being necessary to create metallurgical bond.

In addition to the various examples provided herein, a variety of other alterations or various variations to the basic concept are also contemplated, and various modifications to the process and processing parameters can be undertaken. In one embodiment of the present invention, the friction stir welding tool is inserted or oriented so as to contact the bottom or side of the groove and generate additional heat at these points of contact. This method generates heat at the interface where it is needed to form the intermetallic and is not generated in the bulk material where overheating could degrade the properties. This rubbing between the tool and underlying steel exposes atomically clean surfaces which facilitate formation of intermetallics. In other embodiments, the groove or the dovetail may contain features that when brought into contact with the FSW tool cause this heating to take place and enhance the formation of intermetallic features. In other embodiments the shape of the FSW tool or tip may be modified so as to engage selected portions of the groove or the groove may be variously configured to engage with the FSW tool in a particular way. Examples of various modifications are shown in FIGS. 9, 10, and 11.

Figure 10:
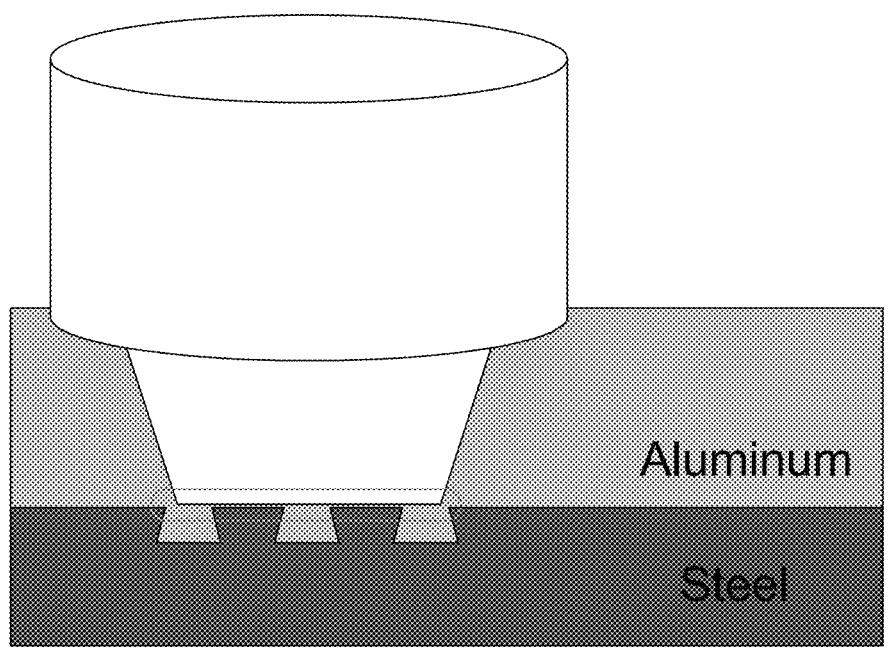

FIG. 10 for example, shows an embodiment wherein the dimensions of the dovetails are proportioned to be generally shallow and small as compared to the pin diameter of this tool. Because the dovetails are shallow and small compared to the diameter of the pin tip, the overheated area created by contact between the pin and high temperature material is generally larger compared to other arrangements and is sufficient to generate a hot layer of material that can form a continuous layer of intermetallic features above and within the dovetails. In other embodiments of the invention induction heating is used to produce localized heating at the interface. In other embodiments plasticized material is forced through narrow openings between the tool and the higher melting temperature material within the dovetail to produce high temperature while the material flows. This localized heating within the gaps will cause localized heating within the gaps allowing for formation of intermetallic layers in the openings.

Figure 11:
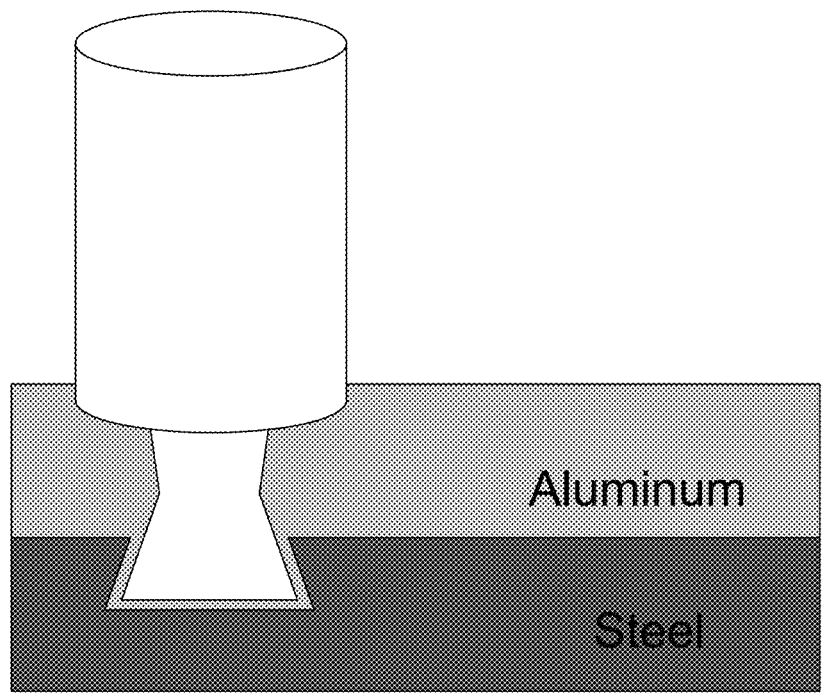
Figure 12:
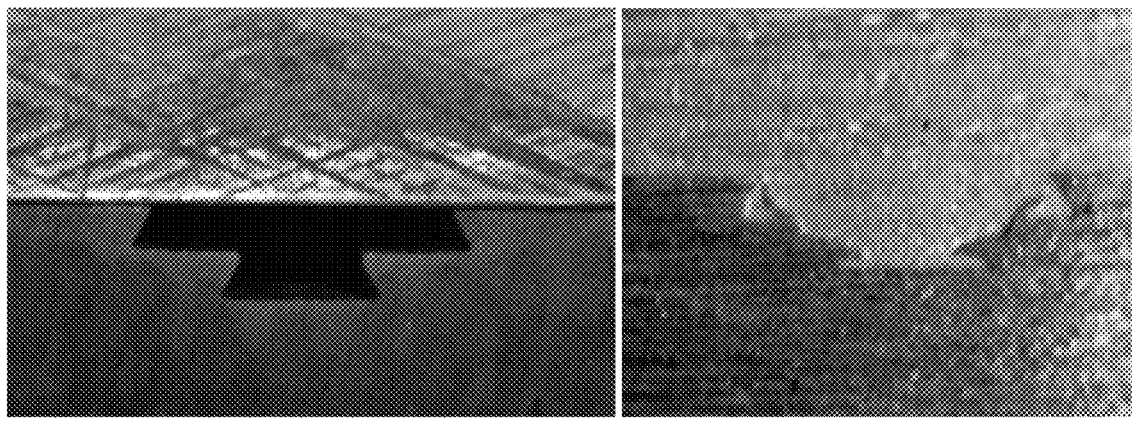
FIGS. 12-14 shows various feature designs and the respective joints formed therein.
Figure 13:
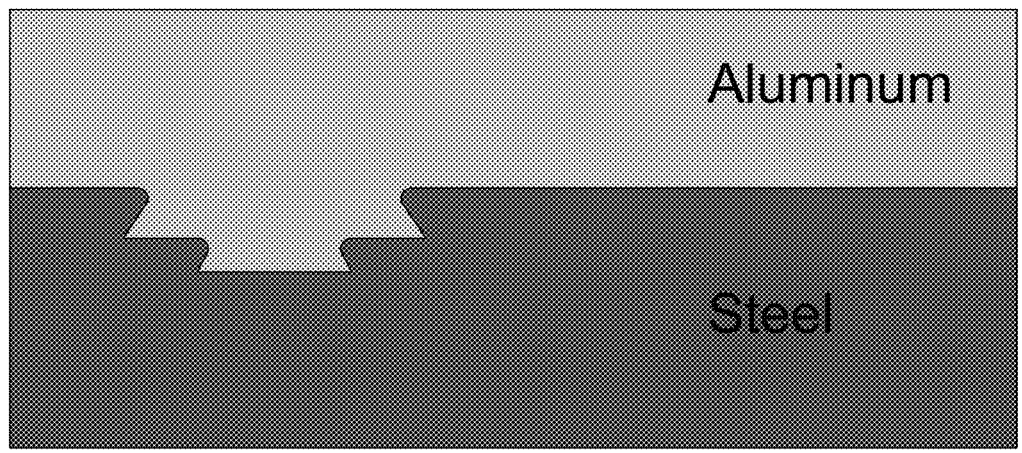

In other embodiments of the invention, the formation of intermetallic hooks of higher melting material are formed by running the tool within the dovetail while the tool is biased such that it contacts one or both side of the dovetail joint and higher temperature material into a hook as shown in FIG. 11. This provides an advantage in that it increases the area of intermetallic contact between the dissimilar materials and assists in forcing the materials together. In other embodiments generally squared grooves are formed in the higher temperature material and then heated with the friction stir welding tool to cause the corners of the device to rise and form hooks in the lower melt temperature materials. In other embodiments the heating process forms intermetallic hooks 1294. These hooks 1294 are formed by plunging the tool into to the lower of two nested dovetails (as shown in FIG. 12) such that the edges of the tool contact the corners 1292 of the lower dovetail resulting in the formation of two hooks 1294 of higher melting temperature material that extend upward into the lower melting temperature material.

While this specific example is provided the particular squared form of the groove should not be seen as limiting and it should be understood that various other embodiments wherein the geometry provides that pushing the tool into a fabricated groove or slit or against the edge of a groove slit so as to cause the higher melting temperature alloy to form a hook or other feature that extends into the lower melting temperature material during friction stir processing, welding or dovetailing are also contemplated. Examples of such configurations and embodiments are found for example in FIG. 13.

Figure 14:
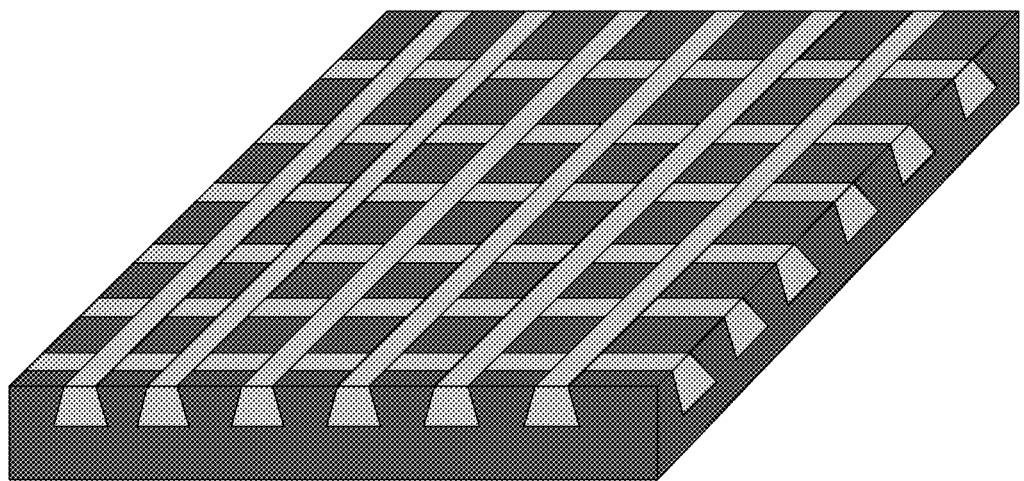

In other arrangements such as the one shown in FIG. 14 mechanical interlocking is accomplished by deforming groves that are easier or faster to manufacture. In instances a rastering grid can be produced. When the friction stir processing tool is sufficiently close to or contacts these grooves during welding, these grooves can have sections that are deformed and form intermetallic features that fill groves and provide strong interlocking. While straight grooves are shown for purposes of illustration this is not meant to be limiting. Various alternatives and modifications can be undertaken to deform the groove during welding to create mechanical interlocking or increase the amount of mechanical interlocking. In addition to the geometry that is shown a variety of other geometries including nesting features, multiple T-slots or notches or other fabricated features may be used to created layers of interlocking features. In some embodiments the dovetails or other mechanical interlocking features with rounded corners improve flow of material into the dovetail and reduce fatigue.

Preferably the tool temperature and force are maintained constant so as to provide consistency along the weld path and manage the strength of the various parts. This is accomplished in one set of embodiments by controlling the tool temperature control algorithm and a force control algorithm in conjunction with techniques where the tool contacts the dovetails. Constant tool temperature and position improves consistency of the intermetallic layer and uniformity of size of generated hooks or new features along the weld path and from part to part. In some applications improved performance was obtained when a two piece friction stir welding tool was utilized wherein the pin and shoulder of the tool can move axially relative to one another.

In cases where the pin is contacting the high temperature material within the dovetail, the pin can extend into the dovetail as material is worn from the pin without affecting the shoulder position. This could be done for example by having a servo actuated pin and shoulder that allows for selective connection and release. In another embodiment a spring loaded pin could be used to force more material out and keep pin length relatively constant despite wear on the pit itself. In another embodiment of the invention the upper low melting temperature materials are being extruded into the dovetail groves of underlying high melting temperature materials using a counter-clock wise threaded pin within the FSW tool. Thus clockwise rotation of the tool causes downward extrusion of the plasticized material. Locally heating dovetail interface caused metallurgical bonding by kneading action.

In as much as the present invention utilizes the combination of mechanical interlocking with intermetallic formation various modifications and alterations could be made so as to enhance and foster the development of intermetallic interconnects at a lower temperature. In one example, a materials such as Yttrium, Tungsten, Molybdenum, Iron compounds and others could be applied to reduce the temperature or improve the rate of formation of intermetallic to the dovetail joints prior to FSD. This could be done using cold spray, thermal spray or any other deposition method which can also be used to tailor the composition of the intermetallic layer.

In another example pre-filled dovetails are utilized wherein the mechanical grooves in the higher temperature material is pre-filled with lower melting temperature material. This can reduce or eliminate the excess material that maybe removed from the top of the lower melting temperature material when filling the dovetail. This prefilling can be accomplished by filling the groove with bar stock, powder chips of other forms of the lower temperature material. In another embodiment a laminated approach could be used wherein arc welding, strip cladding or other fusion welding techniques are used to bond lower temperature materials such as aluminum inside of the dovetails and then execute friction stir welding to create the intermetallic hooks and interconnects. This can improve process robustness, welding speed and can prevent the formation of a recess at the top of the weld from material lost to fill the dovetail.

In one application friction stir welding was used to apply cladding by creating a dovetail grid similar to the grid shown in FIG. 14. While the term grid connotes a square or rectangular geometry it is to be understood that the grid can be circular or any other shape and while the grid would likely be two dimensional on flat cladding and three dimensional on contoured cladding these parameters are not limiting. This cladding arrangement allows for the use of a grooved grid for forming a mechanical interlocks that will in turn dramatically improve resistance to ballistic impact and provides the multi directional strength and fatigue life of thick section cladding. In one set of preferred embodiments a two pass technique for accomplishing this was utilized wherein one pass of the friction stir device was made to create the intermetallic layer or layers along the dovetail interface and a second pass, run at much cooler process conditions followed which increased the strength of the material inside the dovetail while maintaining the intermetallic interface.

Figure 15:
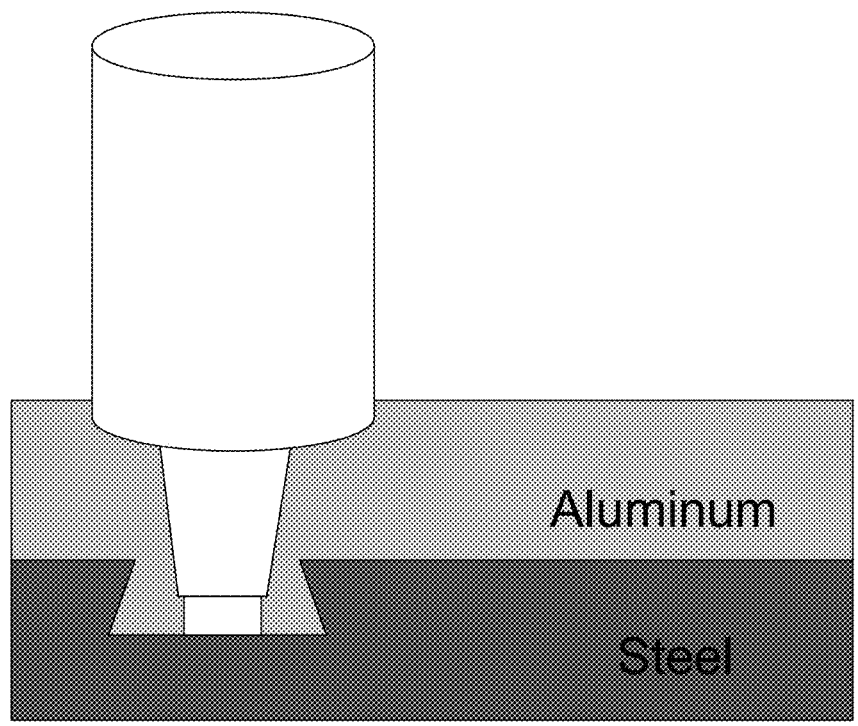
FIGS. 15-18 show examples of such friction stir tooling.
Figure 16:
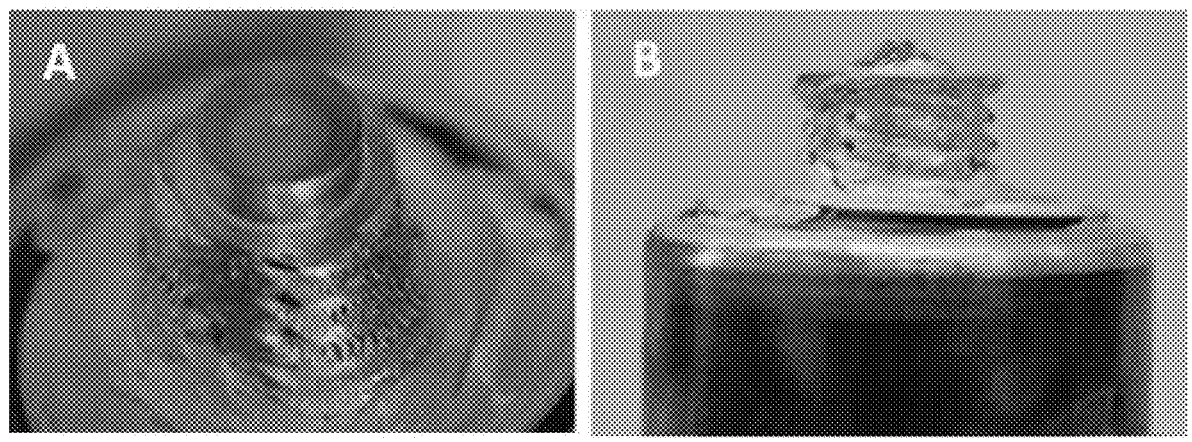

Specialized tooling capable of 1) heating the dissimilar metal interface within or adjacent to the dovetail to temperatures higher than the stir zone and 2) "kneading" a thin interfacial layer to locally mix the dissimilar metals can also assist in the performance of the method. The simultaneous localized temperature rise and kneading at the dissimilar metal interface are achieved by pressing the tool against the higher temperature material during FSD. Tool and dovetails configurations can be designed in coordination to allow for contact anywhere or everywhere within the dovetail. This method enables the formation of intermetallic and/or amorphous bonding at the dissimilar interface, which reinforces the joint, while stir zone temperatures are kept low. A low stir zone temperature are preferable for minimizing degradation of bulk material properties in the lower melting point material. Examples of such tooling are shown in FIGS. 15-16. Tooling Friction stir tools have been developed with features specifically intended to extrude lower melting point metal into dovetail grooves in a higher melting point material; while simultaneously forming a metallurgical bond at the dissimilar interface. The tools contain an insert (such as tungsten-carbide, tungsten-rhenium, polycrystalline boron nitride, etc. . . . ) within the pin tip which enables high wear resistance and consistency of the metallurgical bond. For example, a tungsten-carbide insert could be press fit into an H13 steel FSW tool. The insert rubs against the higher melting point material, within the dovetail groove, and gives dramatically improved tool life and wear resistance compared to tools without a tip insert. The intent is to protect insertion of high wear resistant materials into FSW tools as a pin, or pin insert, for the purpose of rubbing the higher melting temperature in a dissimilar dovetail joint—for the purpose of creating a metallurgical bond. These illustrative examples are not intended to restrict the possible configurations.

Figure 17:
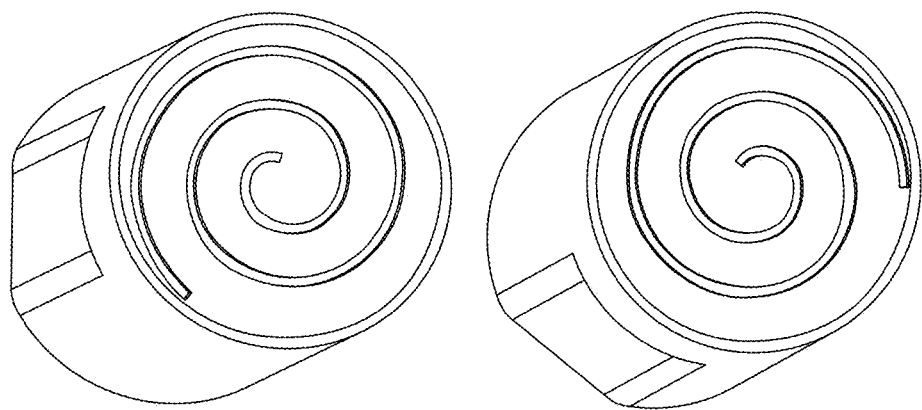
Figure 18:
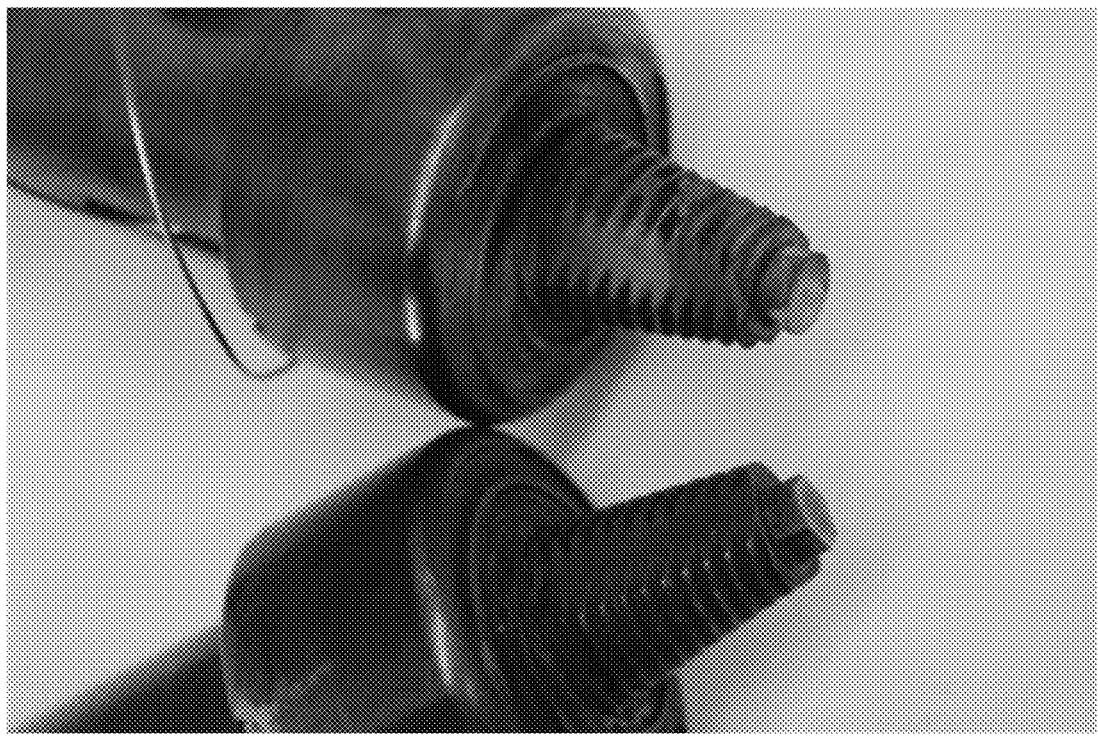

In one embodiment a tip insert is the tool feature that interacts with the dissimilar material interface. The insert can be flat or convex, and may contain scrolls, stepped spirals or other features that enhance "kneading" of the dissimilar materials and also expose new material and push surface impurities away from the interface. Illustrative insert configurations are shown in FIG. 17. The insert may be circular, hexagonal, square, or any shape desired. These features are unique from other tip features attempted in FSW because these features are designed to push material outward and to encourage the formation of a metallurgical bond at a dissimilar metal interface.

Figure 19:
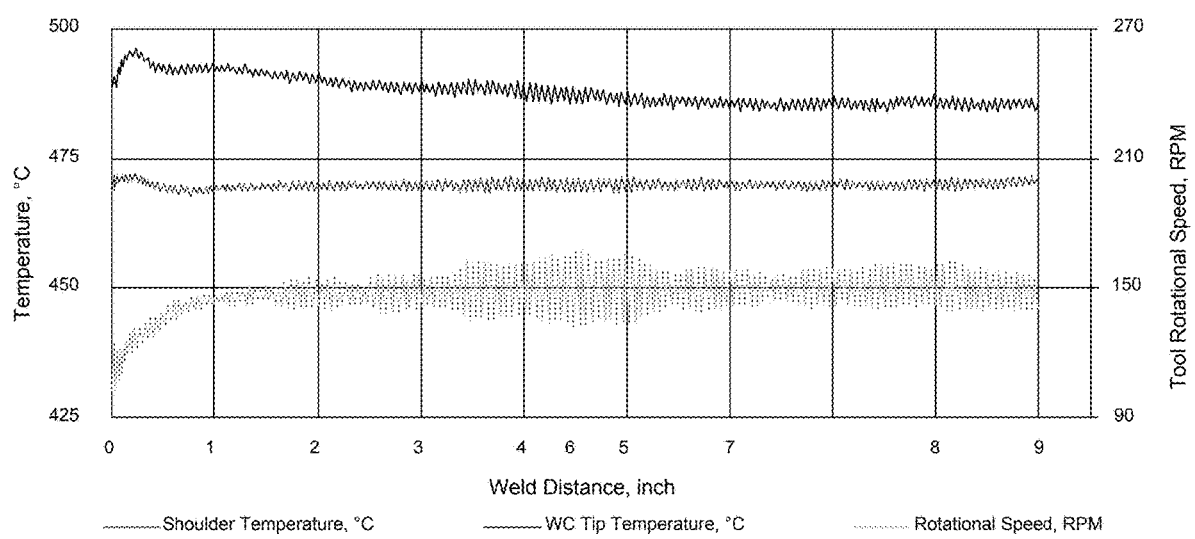
FIG. 19 shows information of one set of process parameters.

FIG. 16a shows the H13 FSW tool with circular tungsten carbide tip insert after eight linear feet of welding. The pin is not deformed and the tungsten carbide insert has no visible sign of wear. By comparison, FIG. 16b shows a H13 FSW tool without a tip insert after eight linear inches of welding. Wear and deformation is immediate when a hardened insert is not used when rubbing to generated an intermetallic bonding layer. Use of a tungsten carbide insert dramatically improves tool wear for this new process. In one set of tests two examples of FSW tools having tungsten-carbide inserts within the pin tip were used, see FIG. 18. The upper tool contains a cylindrical insert and the lower tool contains a hexagonal insert. The cylindrical insert configuration was used to join AA6061 to Rolled Homogenous Armor (RHA) MIL-DTL-12560J in a lap weld configuration. The upper material of the lap joint was 0.5" thick AA60601 and the lower material was 0.5" thick RHA containing a single dovetail. A single tool was used to weld eight linear feet without visible signs of wear or degradation of the tip insert. FIG. 19 shows that in use, the temperature was higher at the face of the tip insert (area of rubbing on the RHA) than at the shoulder which is an important for making the key feature for forming a metallurgical bond. In traditional FSW, the shoulder is the highest temperature—which is not desirable in the present arrangement.

Figure 20:
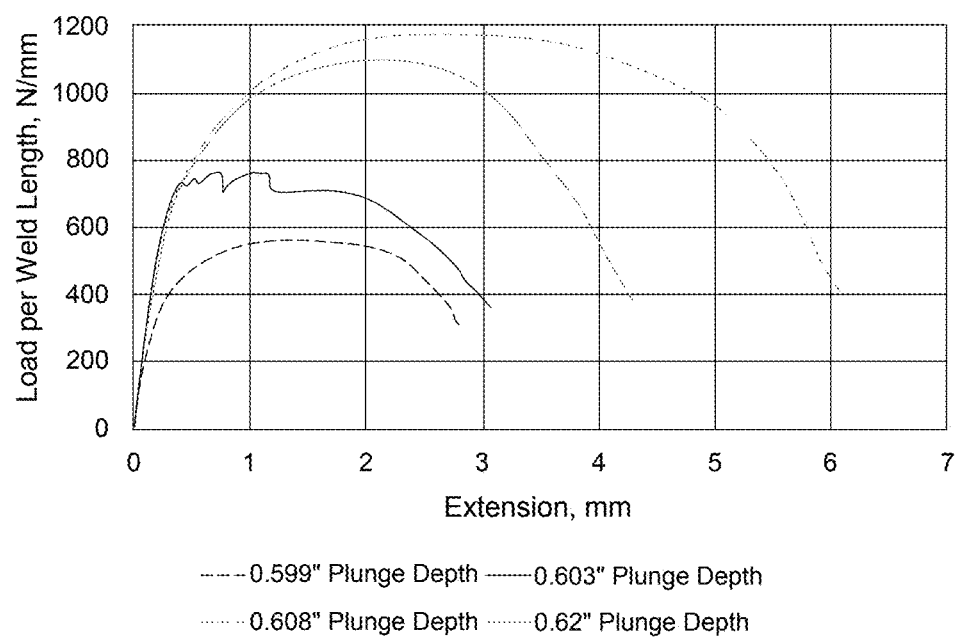
FIG. 20 shows load vs. extension curves for different plunge depths.

In one set of experiments nine sets of lap joints were welded having key parameters within the following ranges. Tool speed 100-250 rpm, federate up to 7.5 cm/min, force 25-100 kN, torque 250-350 Nm, tip temperature 450-550 degrees C., shoulder temp 400-500 degrees C. These samples were then tested at different plunge depths. FIG. 20 shows load vs. extension curves for different plunge depths (0.599", 0.603", 0.608" and 0.620") of the FSW tool. The 0.599" case did not involve rubbing of the tip insert within the dovetail grooves for the express purpose of determining baseline strength in the absence of a metallurgical bond. The other three plunge depths were intended to impart increasing amounts of rubbing between the tip insert and base of the RHA dovetail. A total of 26 specimens were tensile tested (qty 6 for 0.599", qty 5 for 0.603", qty 6 for 0.608", qty 9 for 0.620"). The four curves in the following plot represent an average of each grouping. From this plot it is clear that the highest strength and largest ductility (extension) is for a plunge depth of 0.608". A smaller plunge depth of 0.603" gives lower strength and ductility as does a larger plunge depth of 0.620".

Figure 21:
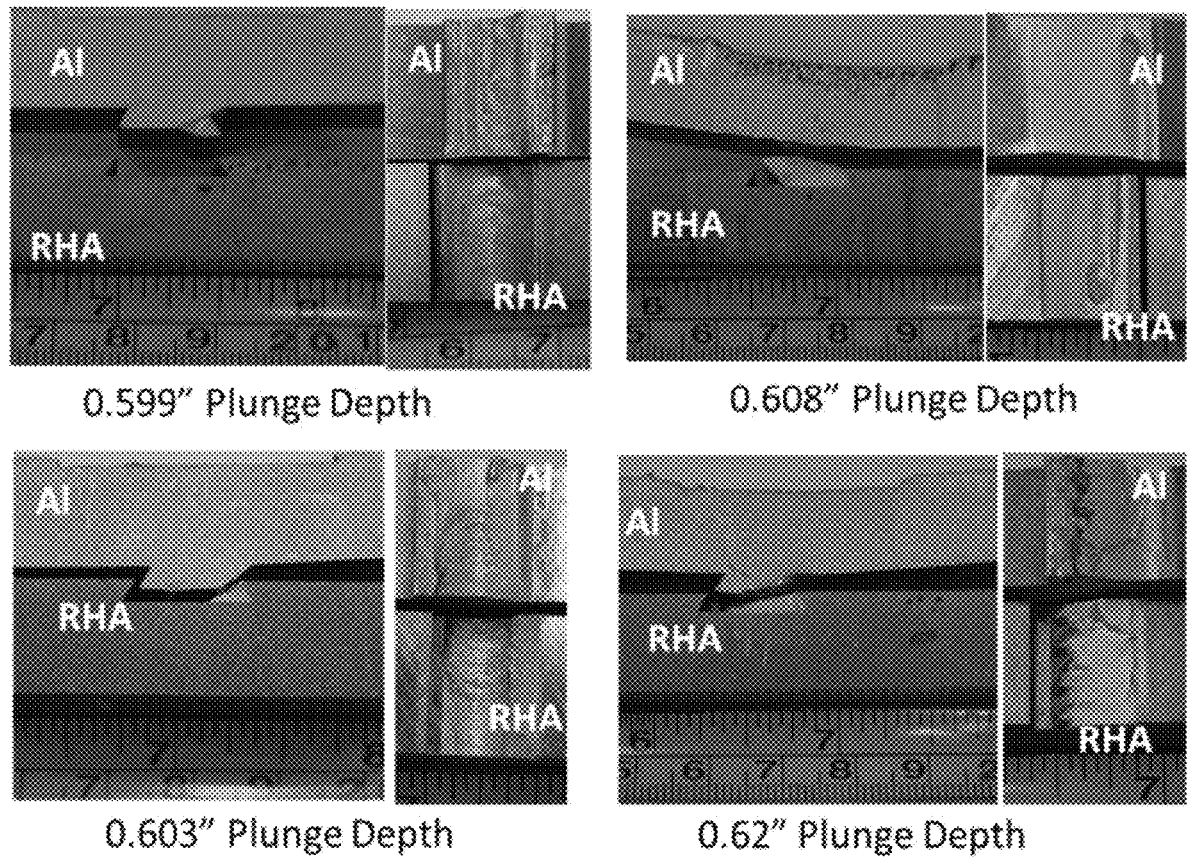
FIG. 21 shows the failure morphologies discovered during tensile testing having the data shown in FIG. 20.

FIG. 21 shows that the failure morphology during tensile testing (AA6061 being pulled to the right and RHA being pulled to the left) is very different for each of the four curves in the above plot. For the 0.599" plunge depth, the aluminum simply pulls out of the dovetail as the aluminum corner plastically deforms. For the 0.603" plunge depth, a weak metallurgical bond is formed which fractures in a brittle manner and then shears at the aluminum corner. For the 0.62" case, the metallurgical bond does not fracture and failure occurs in the bulk aluminum within the dovetail resulting in higher strength and ductility. The case with the highest strength and ductility is for the 0.608" plunge depth where shear failure occurs in the bulk material.

Figure 22:
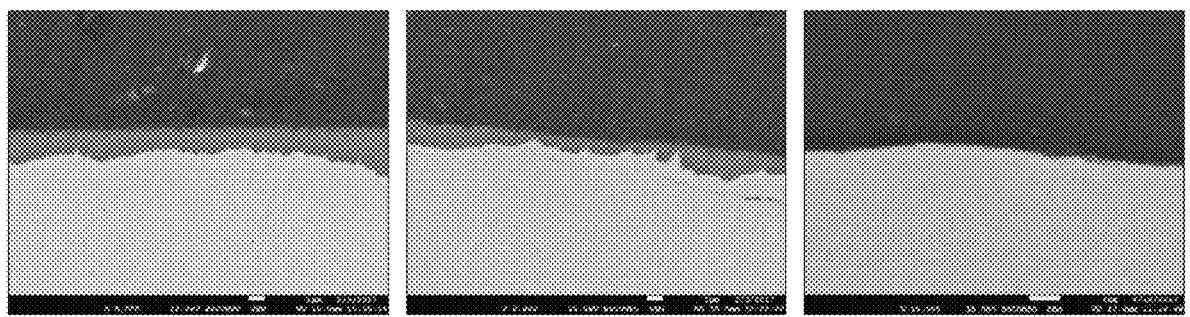
FIG. 22 shows different interlayer thicknesses that are generated under the present embodiment.

FIG. 22 shows different interlayer thicknesses (2.2 micron on left, 1.3 micron in middle and 100 nm on right) that are generated. The phase (for example, intermetallic or amorphous) and strength of the metallurgical bond at the dissimilar interface are affected by temperature as well as the strength of the heat affected zone in the aluminum. Controlling temperature in the stir zone and the dissimilar metal interface simultaneously can be performed by modulating the spindle axis speed, torque, current, power or any combination of these variables. The temperature of the dissimilar interface is preferably controlled by modulating the position, forge force or motor torque of the forge axis. Control algorithms governing the temperatures in the stir zone and at the dissimilar interface operate independently, but may be linked together as part of multivariable control scheme.

In one embodiment the spindle axis is used to control the temperature of the stir zone and the forge axis to control the temperature at or near to the dissimilar interface. This could be done with a monolithic tool or with a two piece tool where the shoulder and pin can move relative to each other along the forge axis. Another embodiment of this concept is to use the spindle axis to control the temperature at or near the dissimilar interface and the forge axis to control the temperature of the stir zone. This could be done with a monolithic tool or with a two piece tool where the shoulder and pin can move relative to each other along the forge axis. Typically the spindle axis is controlled by commanding speed, torque or power to regulate temperature and the forge axis is controlled by commanding a force, velocity or position change to regulate temperature. In FSW machines that allow the pin to rotate relative to the shoulder one spindle axis can control the temperature of the stir zone, while the other control the temperature at the dissimilar interface.

The friction stir dovetailing process can also be used to join dissimilar materials with a myriad of different joint configurations. For example, metal with a higher melting point (for example steel) can be "buttered" (coated) with a metal having a lower melting point (for example aluminum) such that subsequent fusion welding can be performed to form previously impossible configurations for dissimilar metals. This "buttering" can be single or double sided and the thicker section can be either the higher or lower melting point material. The buttered layer, or underlying steel, may contain features (not illustrated due to the limitless embodiments) such as tabs, angles, holes, slots and other features that enable subsequent fusion welding of joints having a final configuration that is otherwise unweldable for dissimilar metals. Buttering can also enable subsequent fusion welding of a nearly limitless array of other structures and attachments such as extrusions, brackets, threaded shafts, fittings and so forth (also not illustrated here due to the numerous possibilities). Buttering can also overcome clearance/access issues during manufacturing that are currently preventing adoption of FSW in vehicle applications. The buttering approach can also enable fusion welding in areas for materials where welded properties are more beneficial than FSW; all while simultaneously allowing a joint between dissimilar metals. Another example is the enabling of interior joints that are otherwise impossible for dissimilar metals.

The chemistry of intermetallic or amorphous layers/regions affects the mechanical properties and microstructure of the metallurgically bonded interface. The intent is to protect the use of cold spray to deposit a layer of metal within the dovetail to modify the chemistry of the metallurgical bond at the dissimilar interface. One embodiment of this concept is to spray a thin layer of cold spray material on the inner surfaces prior to friction stir dovetailing. Alternatively, the dovetail groove could be filled partially or fully with cold spray material prior to FSW. For example, cold spraying 7000 series aluminum into the dovetails of underlying steel would reduce/eliminate the presence of aluminum alloying elements and therefore change the structure/properties of the bonded interlayer.

The following examples are provided as illustrations of the principles and embodiments described above:

EXAMPLE 1

Solid-state joining of thick section aluminum to steel plate was achieved using a custom designed pin tool in a friction stir welding device to flow a lower melting point material (AA6061) into dovetail grooves previously machined into the surface of an underlying material having a higher melting point (rolled homogeneous armor [RHA]). Repeating dovetails form a mechanical interlocking structure akin to metallic Velcro, however the forming of intermetallic interconnects by the friction stir welding tool strengthened this interconnection. In one example, 38.1 mm (1.5 in.) thick AA6061 was joined to 12.7 mm (0.5 in.) thick RHA plates. Tensile test data showed specimens failing in the processed aluminum rather than at the joint interface.

Figure 23:
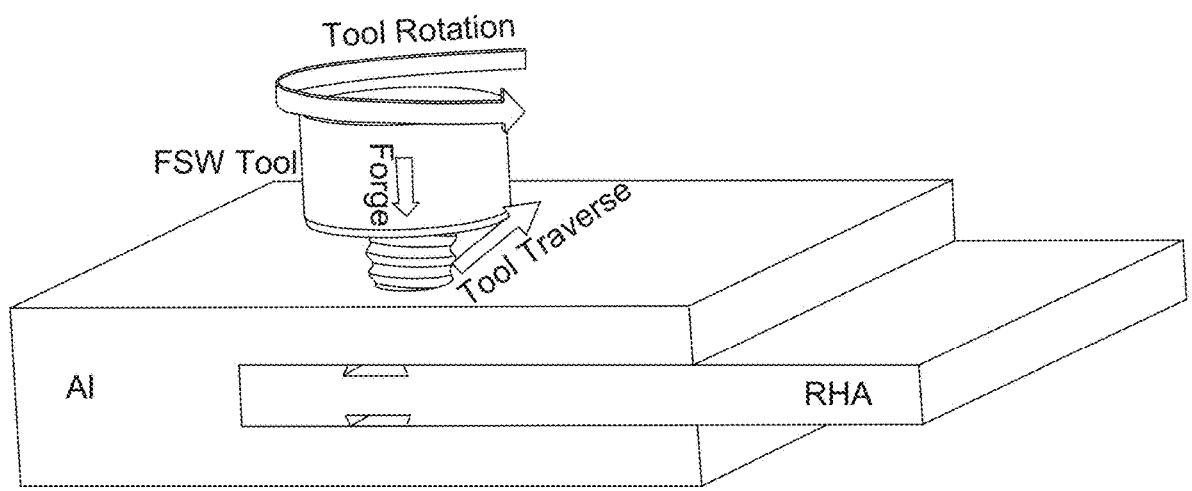
FIG. 23 shows an arrangement of one tested embodiment
Figure 24:
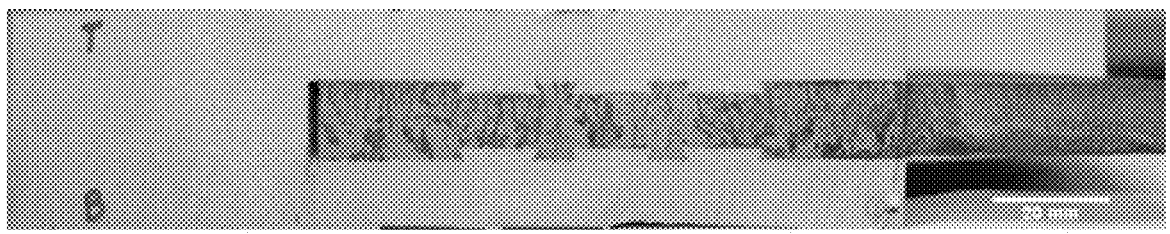
FIG. 24 shows a cross section of one tested configuration

Plates of RHA procured to MIL-DTL-12560J were dual disc ground to a thickness of 12.7 mm and pre-machined dovetail grooves shown in FIG. 23. The RHA plates were inserted into AA6061-T651 sandwich structures having a total thickness of 38.1 mm. FSD was performed using a tool made from H13 tool steel that was heat treated to obtain RHC 45. The one-piece FSW tool consists of a scrolled shoulder and a frustum shaped)(6.1° threaded +3 flatted pin. FSD was performed using a tool rotational speed of 275 RPM and welding speed ranging between 25-50 mm/min. All welding was performed using a position control mode where the forge force is a response variable of the commanded plunge depth. Welds were made on the top side, then machined flat, and the assembly was turned over to weld the bottom side. Tensile specimens were cut from the welded Al-steel to an average thickness of 12.0 mm using a water jet. A cross section is shown in FIG. 24. Standard grinding and polishing sequences were followed for metallographic sample preparation and final polished surface was obtained using colloidal silica (<0.05 µm).

Figure 26:
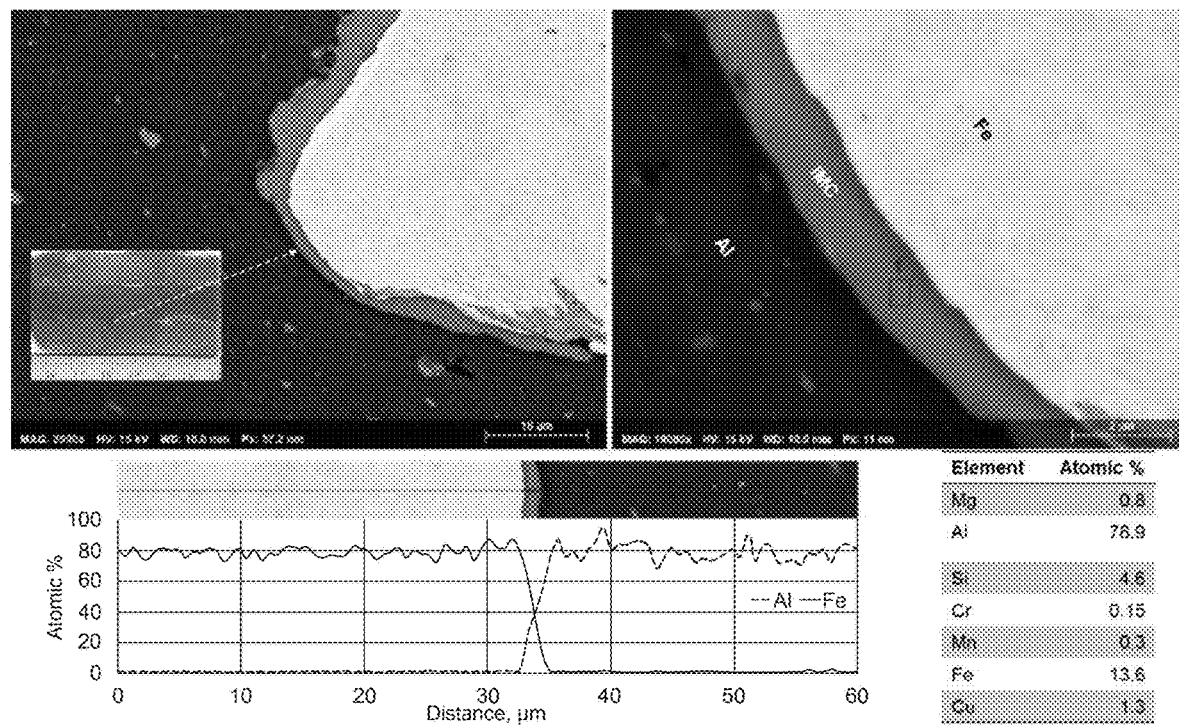
FIGS. 26-27 show the results of testing on the dovetail geometries of FIG. 25.
Figure 27:
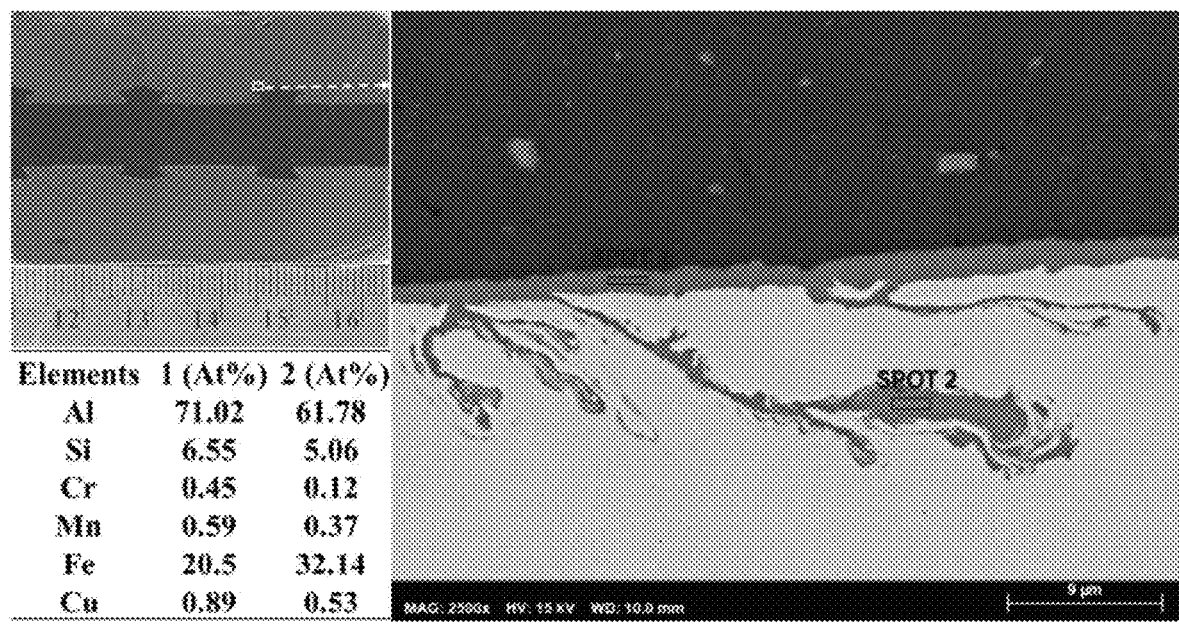

A scanning electron microscope (SEM) equipped with energy dispersive spectroscopy (EDS) was employed to investigate the intermetallic formation. Tensile testing of sandwich plates was performed using a 50 kip MTS test frame to ascertain tensile test and microstructural observations. The results of that testing are shown in FIGS. 26-27. Structural analysis of a dovetail joints between AA6061 and RHA subjected to tensile load was simulated using LS DYNA finite element software. The simulation predicted the failure of tensile specimens with, and without, the formation of IMCs along Al and RHA dovetail interface. Cases for 1, 2 and 3 dovetails having the outlined geometries (shown in FIG. 25) were structurally analyzed.

From the finite element simulations, it was observed that shear failure of the Al dovetail occurred for configuration with one, two and three dovetails when no intermetallic connection is present. Therefore, simple dovetail interlock without bonding doesn't have impact on structural integrity regardless of the number of dovetails. The testing showed that joint strength is improved when IMC is present at the Al-RHA interface within the dovetail. In the case of IMC being present, only two dovetail features are required to cause failure in the bulk Al. In general, the results of this structural analysis indicate that, the presence of IMCs formation improves joint efficiency in the FSD process. As a result, steps were taken to generate an IMC at the Al-RHA interface while simultaneously filling the dovetail grooves.

Figure 25:
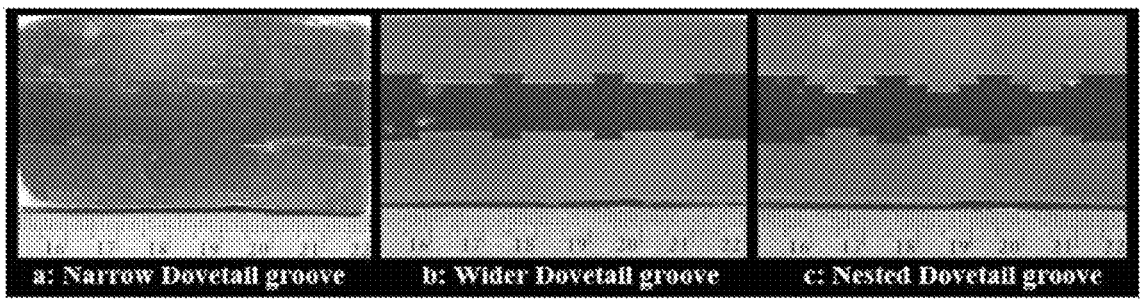
FIG. 25 shows various dovetail geometries.

Transverse macro sections of Al-RHA joints with different dovetail geometries are shown in FIG. 25. The macro-sections clearly demonstrate the effective filling of Al into the dovetail grooves regardless of dovetail geometric variations. The FSD process is quite robust in terms being able to fully fill the grooves. For example, welds were performed (from 200 to 275 rpm and 25 to 100 mm/min) with the tip of the tool ranging from 2 mm above the RHA surface to having the tool tip in contact with the bottom of the dovetails. In all cases, the grooves were fully filled with no voids observed. While FIG. 25 provides a macro-view of weld cross sections in terms of defect formation and dovetail filling, metallographic analysis is needed to determine the bonding state along the Al-RHA interface. SEM analysis at the Al-RHA interface of specimens in are shown in FIGS. 26 and 27 respectively.

The data indicates that interfacial bonding has occurred due to the formation of an IMC measuring 0.5 µm to 1 µm thick in narrow dovetail grooves and 1.0 µm to 2.0 µm thick in wider dovetail grooves. The SEM micrographs suggest that incipient melting of AA6061 during FSD might cause bonding between RHA and Al with the formation of an intermediate transition layer which will be further confirmed as IMCs from energy dispersive spectroscopy (EDS) analysis. The formation of IMCs was confirmed by elemental quantitative analysis using EDS. The spot (area) and line scanning energy spectrum results are combined with the SEM micrograph in FIG. 27. The atomic percentage of corresponding line scans of Al and Fe at the intermediate transition layer indicate a diffusion profile of Al and Fe across the interface suggesting IMC formation. Moreover, the EDS spot analysis of this layer showed 79 at. % Al and 14 at. % Fe. In FSD, intense plastic deformation of AA6061 by the stirring tool might cause incipient melting of Al in close proximity to the RHA due to high localized temperature. The increased heat input caused by the tool contacting and deforming the RHA resulted in the formation of possible multiple IMCs (AlFe, Al3Fe, FeAl2, Al4Fe, Al13Fe4, Al5Fe2 etc.) at the bonding interface which might be further confirmed from temperature measurement during FSD, phase diagram analysis and corresponding X-ray diffraction analysis.

The macro cross section shows the deformed layer of RHA near the upper region of dovetails where the stir tool intentionally contacted the RHA during processing to locally increase temperature and promote IMC formation. Consequently, the growing of IMCs were evident outside the dovetail in the SEM and EDS analysis. Frictional heating due to contact between the stir tool and RHA may result in the Al being melted locally, thereby resulting in the formation of IMCs. According to the EDS spectra and elemental composition, the intermetallic compounds FeAl2, Fe3Al or Fe2Al might form in the Al-RHA interlayer.

Figure 28:
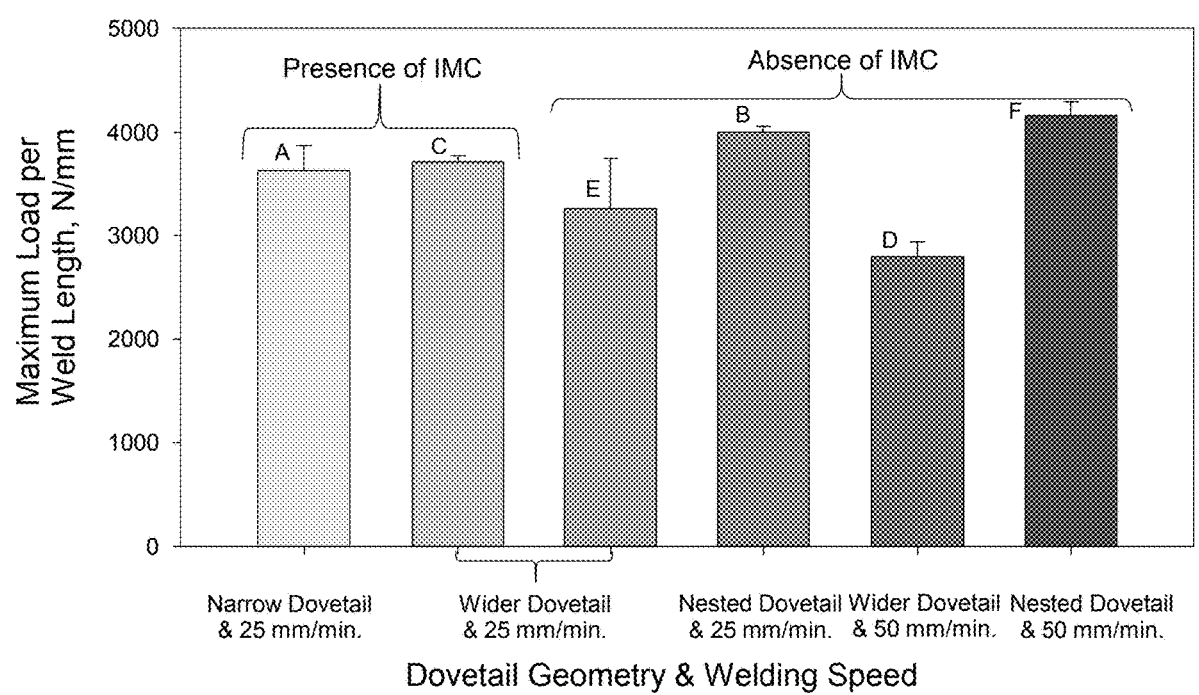
FIG. 28 shows the maximum tensile load per unit length of weld (i.e. specimen thickness) plotted against different dovetail grooves and welding conditions.

FIG. 28 presents the maximum tensile load per unit length of weld (i.e. specimen thickness) plotted against different dovetail grooves and welding conditions. It was observed that nested dovetails result in higher strength than single wider dovetails regardless of welding speed. The higher load carrying capacity provided by nested dovetails is due to the additional interlocking that resists deformation in the tensile and transverse directions. In the absence of IMC, there does not appear to be a statistical difference in the load at failure on the weld speed range of 25-50 mm/min. However, inclusion of the IMC within the wider single dovetail at 25 mm/min was found to increase strength compared to the case of no IMC. This speaks to the role of IMC formation for improving joint strength. The narrow dovetails welded at 25 mm/min have IMC formation outside the dovetail and interestingly show higher strength than the wider dovetails with IMC. From this data, we concluded that the formation of IMCs significantly improves joint strength.

Figure 29:
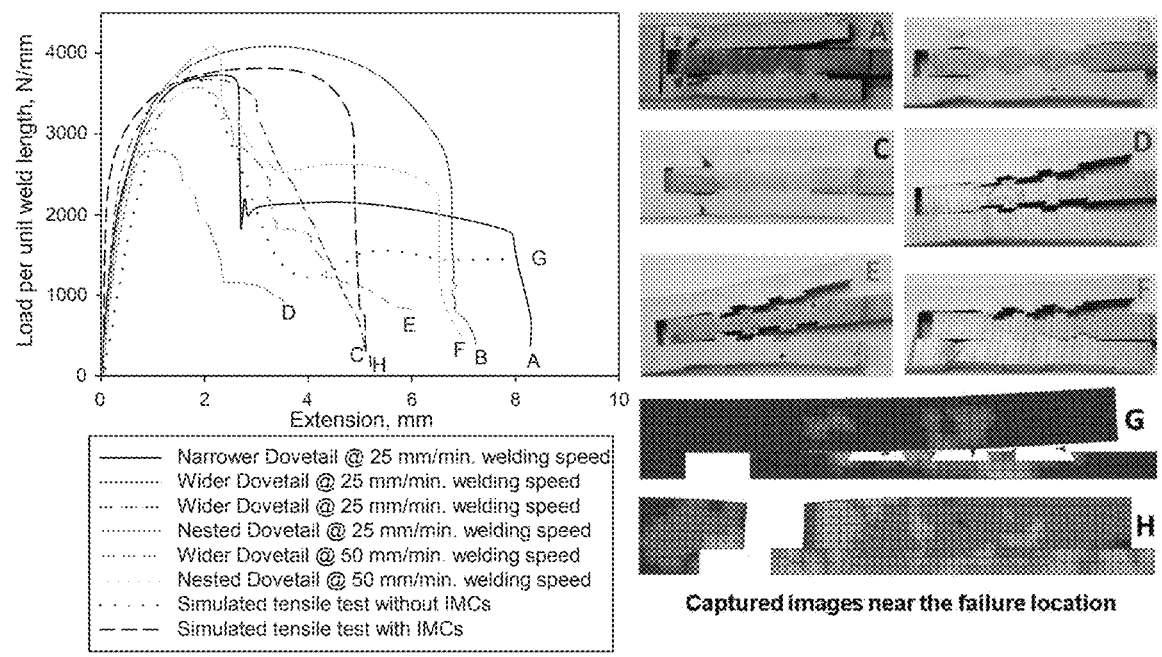
FIG. 29 is a plot of a function of extension for different dovetail geometries.

The normalized load (load per unit weld length) as a function of extension for different dovetail geometries is plotted in FIG. 29. Failure of the narrower dovetail specimen (A) occurred due to fracture of the brittle intermetallic layer on one side of the sandwich structure at peak load which is followed by ductile failure of bulk Al due to eccentric loading. For the specimens D and E, successive separation of dovetails occurred after reaching the maximum load as the dovetails tend to unzip one pair after another. This phenomenon is indicated by the changes in slope of the load curves on their descending part as tensile testing progress to joint failure. For the nested dovetail welded at 25 mm/min corresponding to specimen C, failure occurred in the processed Al rather than at the dovetail interlock. As mentioned earlier the volume of the filled Al in the nested dovetail is high enough to encounter the tensile loading near the region of the additional interlock, resulting in failure in the Al with the failure plane perpendicular to the loading direction. The failure of the tensile specimen C is similar to specimen B. However, an additional contribution of bonding between Al and RHA with the formation of IMCs resulted in a bulk Al failure rather than a failure at the joint. This is indicative of the strength of the joint and demonstrates the viability of extending to a wide range of material stack-up (50 mm or higher thickness) to form dovetail interlock.

While various preferred embodiments of the invention are shown and described, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A method, comprising:
   engaging a first surface of a first material having a higher melting temperature with a second surface of a second material having a lower melting temperature, wherein:
   the first surface defines nested dovetail grooves in the first material;
   a first dovetail groove of the nested dovetail grooves defines a base and sidewalls in a vertical cross-section; and
   a second dovetail groove of the nested dovetail grooves defined within the base of the first dovetail groove;
   wherein the method comprises friction stir welding the second material and the first material with a friction stir welding tool that:
   plunges to a depth greater than a thickness of the second material; and
   plunges into the second dovetail groove such that edges of the tool contact corners of the second dovetail groove resulting in formation of hooks of the first material that extend upward into the second material.

2. The method of claim 1, wherein the first material is a steel material and the first surface is a steel surface.

3. The method of claim 1, wherein the second material is an aluminum material and the second surface is an aluminum surface.

4. The method of claim 1, wherein the friction stir welding creates sufficient heat to bring the first material to a temperature to increase an area of intermetallic contact at an interface with the second material.

5. The method of claim 1, wherein the friction stir welding creates sufficient heat to plasticize the first material.

6. The method of claim 5, wherein the heat is created through friction.

7. The method of claim 1, wherein the friction stir welding tool has a scrolled shoulder and a frustum shaped threaded and flatted pin.

8. The method of claim 1, wherein:
the friction stir welding is performed using a tool rotational speed between 50 and 5000 RPM and a welding speed ranging between 1-5000 mm/min.

9. The method of claim 8, wherein the friction stir welding is performed using a tool rotational speed between 200 and 400 RPM and welding speed ranging between 25-50 mm/min.

* * * * *